United States Patent
Motazedi et al.

(10) Patent No.: US 11,928,525 B2
(45) Date of Patent: Mar. 12, 2024

(54) TEMPORAL DISENTANGLEMENT PROTOCOL FOR EVENT ORDERING

(71) Applicant: Accenture Global Solutions Limited, Dublin (IE)

(72) Inventors: Eric Motazedi, Centennial, CO (US); Amir Ehsani Zonouz, Newton, MA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/720,532

(22) Filed: Apr. 14, 2022

(65) Prior Publication Data

US 2022/0334894 A1  Oct. 20, 2022

Related U.S. Application Data

(60) Provisional application No. 63/175,176, filed on Apr. 15, 2021.

(51) Int. Cl.
*G06F 15/16* (2006.01)
*G06F 9/54* (2006.01)
*G06N 5/04* (2023.01)

(52) U.S. Cl.
CPC ............... *G06F 9/542* (2013.01); *G06N 5/04* (2013.01)

(58) Field of Classification Search
CPC .................... G06F 9/542; G06N 5/04
(Continued)

(56) References Cited

U.S. PATENT DOCUMENTS 6,052,363 A * 4/2000 Koch ..................... G06F 9/542
370/252
2007/0179948 A1* 8/2007 Jennings, III ....... H04L 67/1068
(Continued)

FOREIGN PATENT DOCUMENTS

CN     110337069 B *  1/2022  ........... H04L 1/0083
WO   WO 1998/003910     1/1998

OTHER PUBLICATIONS

EP Extended Search Report in European Appln. No. 22168401.2, dated Aug. 30, 2022, 9 pages.
(Continued)

*Primary Examiner* — Liang Che A Wang
(74) *Attorney, Agent, or Firm* — Fish & Richardson P.C.

(57) ABSTRACT

Methods, systems, and apparatus, including computer programs encoded on a computer storage medium, for ordering events within a distribution computing system are described. In one aspect, a method includes receiving, by an upward node from one or more nodes of a distributed computing system, event fragments for corresponding events that have occurred within the distributed computing system. Each event fragment includes an age parameter that indicates an age of the corresponding event from a perspective of a node that sent the event fragment to the upward node. The upward node calculates, for each event, a corresponding disentangled time based on a received time that represents a time at which the upward node received the event fragment for the event and the age of the event indicated by the age parameter for the event. The upward node arranges the events in an order according to the disentangled time for each event.

20 Claims, 17 Drawing Sheets

(58) Field of Classification Search
USPC .................................................. 709/200, 201
See application file for complete search history.

(56) References Cited

U.S. PATENT DOCUMENTS

2008/0072221 A1* 3/2008 Chkodrov ............... G06F 9/542
718/1
2019/0256107 A1* 8/2019 Park ...................... B60W 50/14

OTHER PUBLICATIONS

Drummond et al., "On reducing the complexity of matrix clocks," arXiv, Sep. 23, 2003, arXiv:cs/0309042v1, 13 pages.

Encyclopedia of Algorithms, 1st ed., Kao (ed.), 2008, Chapter C, 129-131.

jftmumm.com [online], "A CRDT Primer Part I: Defanging Order Theory," Nov. 17, 2015, retrieved on Jul. 21, 2022, retrieved from URL<http://jftmumm.com/blog/2015/11/17/crdt-primer-1-defanging-order-theory/>, 16 pages.

Ramabaja, "The Bloom Clock," arXiv, Jun. 9, 2019, arXiv:1905.13064v4, 16 pages.

Rutgers.edu [online], "Logical clocks: Causality and concurrency," dated Feb. 14, 2021, retrieved on Jul. 21, 2022, retrieved from URL<https://people.cs.rutgers.edu/~pxk/417/notes/logical-clocks.html>, 7 pages.

Singhal et al., "An efficient implementation of vector clocks," Information Processing Letters, Aug. 10, 1992, 43:47-52.

Wikipedia.org [online], "Lamport timestamp," available Jul. 5, 2005, last updated May 2, 2022, retrieved on Jul. 21, 2022, retrieved from URL<https://en.wikipedia.org/wiki/Lamport_timestamp>, 4 pages.

Wikipedia.org [online], "Matrix clock," available Sep. 28, 2008, last updated Feb. 15, 2022, retrieved on Jul. 21, 2022, retrieved from URL<https://en.wikipedia.org/wiki/Matrix_clock>, 1 page.

Wikipedia.org [online], "Vector clock," available Jan. 9, 2005, last updated Feb. 8, 2022, retrieved on Jul. 21, 2022, retrieved from URL<https://en.wikipedia.org/wiki/Vector_clock>, 4 pages.

* cited by examiner

```
Size_Q = Len(Q)
Evaluate Age (Q, send_time, b, {min_send_time, α, Size_Q})
T = current.time ()
Send(Q)
avg_send_time = (current.time () – T) / Size_Q
min_send_time = Min {min_send_time, avg_send_time}
```

TEMPORAL DISENTANGLEMENT PROTOCOL FOR EVENT ORDERING

CROSS REFERENCE TO RELATED APPLICATIONS

This application claims the benefit of U.S. Patent Application No. 63/175,176, filed Apr. 15, 2021, which is incorporated herein by reference.

TECHNICAL FIELD

This specification relates to distributed computing systems, data processing, and event ordering.

BACKGROUND

A difficult problem in distributed computing and multi-agent systems is to maintain the causal relationship between events that occur within the systems. This issue can be present due to the limited or absence of access to a universal physical clock that is used to maintain time throughout the system and/or to synchronize clocks throughout the system.

SUMMARY

This specification generally describes systems and techniques for ordering events using a disentanglement protocol. This allows distributed systems and high-level nodes to infer the order and/or time of occurrence of events from the perspective of the high-level nodes. The approaches described in this document use causal event relationships, which alleviates the problem of non-synchronized clocks and the lack of access to a universal physical clock. The systems and techniques described in this document align events dynamically without the need for a universal physical clock.

A node that orders the events, which can also be referred to as an upward node, can determine a disentangled time for each event based on a time at which the node receives an event fragment for the event and age of the event indicated by an event fragment that is sent according to the protocol. The sending node can determine the age of the event based on a difference between a send time for the event fragment and either a time at which the sending node received the event, if received from another node, or a time at which the event occurred at the sending node if that is where the event occurred. The sending node can generate and send an event fragment that includes data indicating the age of the event. Additional techniques can be used to accurately account for various sources of latency in a distributed computing system. The upward node can arrange the events in an order based on the determined disentangled time for each event.

According to some implementations, a method includes receiving, by an upward node from one or more nodes of a distributed computing system, event fragments for corresponding events that have occurred within the distributed computing system. Each event fragment includes an age parameter that indicates an age of the corresponding event from a perspective of a node that sent the event fragment to the upward node. The upward node calculates, for each event, a corresponding disentangled time based on a received time that represents a time at which the upward node received the event fragment for the event and the age of the event indicated by the age parameter for the event. The upward node arranges the events in an order according to the corresponding disentangled time for each event. Other implementations of this aspect include corresponding apparatus, systems, and computer programs, configured to perform the aspects of the methods, encoded on computer storage devices.

These and other implementations can each optionally include one or more of the following features. Some aspects include performing one or more actions based on the events arranged in the order. The disentangled time for each event can be equal to a difference between the received time for the event fragment for the event and the age of the event. The age for each event can be calculated by the node that sends the event fragment for the event to the upward node.

In some aspects, the age for each event that occurred at the node that sends the event fragment for the event to the upward node is equal to a difference between a send time at which the node sends the event fragment for the event to the upward node and a time at which the event occurred at the node. The age for each event that occurred at a different node that is different from a given node that sends the event fragment for the node to the upward node can be equal to a difference between (i) a send time at which the given node sends the event fragment for the event to the upward node and (ii) a timestamp for the event. The timestamp for the event can be received from the different node and is determined by the different node based on a time at which the event occurred at the different node.

In some aspects, the age parameter for each event is selected from multiple possible ages. At least one of the possible ages can be based on an age of one or more other events. The age parameter for each event is based on a minimum send time for sending event fragments.

The methods in accordance with the present disclosure can include any combination of the aspects and features described herein. That is, methods in accordance with the present disclosure are not limited to the combinations of aspects and features specifically described herein, but also may include any combination of the aspects and features provided.

Particular embodiments of the subject matter described in this specification can be implemented to realize one or more of the following advantages. Using the disentanglement techniques described in this document, a node of a distributed computing system can accurately order events that occurred within the distributed computing and multi-agent systems without the need for a universal physical clock and without having to synchronize clocks at the various nodes within the system. This reduces complexities and computational costs required to implement universal physical clocks, e.g., implementing and maintaining the clock itself, coupling the clock to each node, and ensuring continuous communication between the clock and each node. This also reduces the amount of data that has to be transmitted between nodes to maintain synchronization between the clocks of the various nodes. The techniques described in this document enables an upward node to determine causal relationships between events and perform causal ordering without a universal physical clock and without clock synchronization. Causal ordering is an important methodology in distributed systems for nodes in the system to agree on the sequence of events or operations. Causal event ordering is defined as sorting the events in the order of their creation from the perspective of consumer nodes, e.g., an upward node. Accurately ordering events using the described techniques prevents errors that can occur due to inaccurate ordering.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 15 shows example pseudocode for determining average and minimum send times.

Like reference numbers and designations in the various drawings indicate like elements.

DETAILED DESCRIPTION

Figure 1:
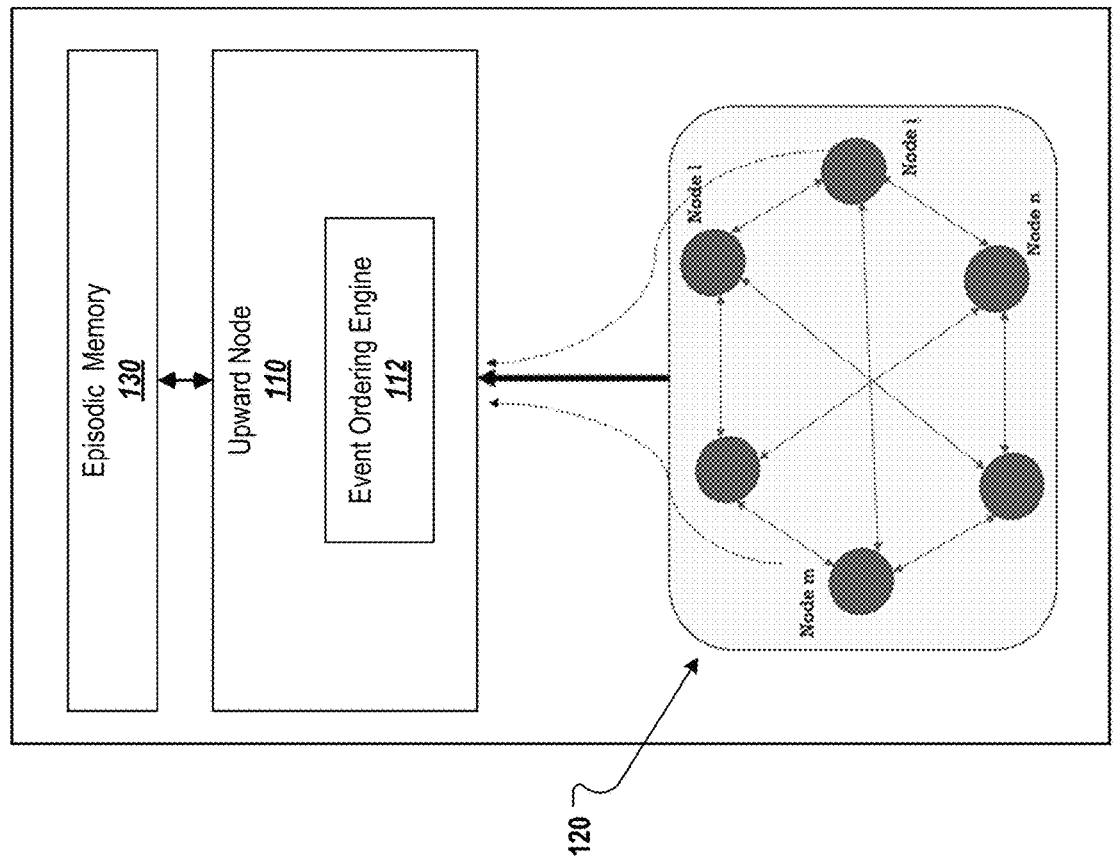
FIG. 1 shows an example distributed system in which a node orders events.

FIG. 1 shows an example distributed computing system 100 in which a node 110 orders events. The distributed system 100 includes the upward node 110 and additional nodes 120 that are connected via a data communication network, such as a local area network (LAN), a wide area network (WAN), the Internet, a mobile network, or a combination thereof.

Figure 4:
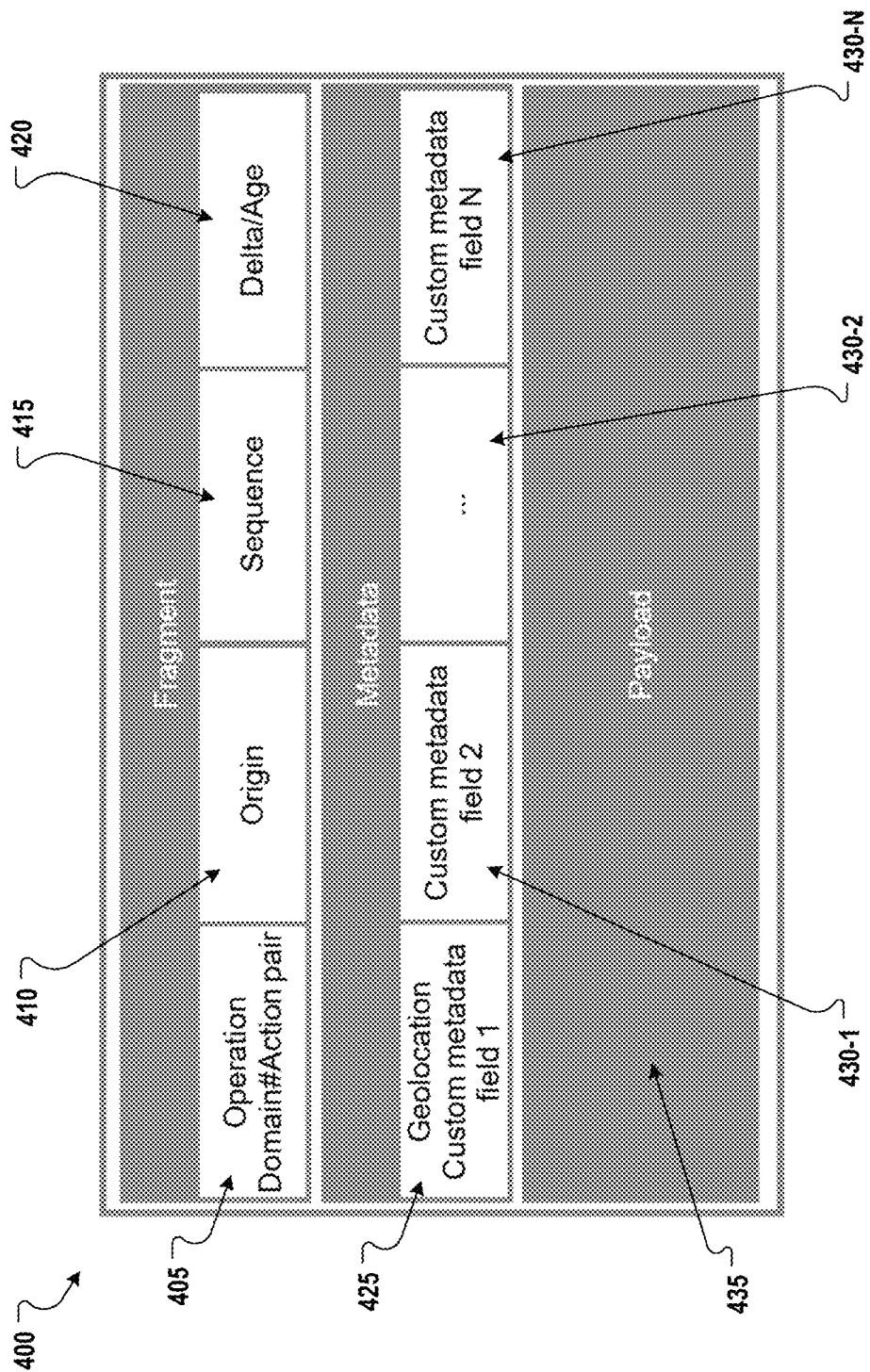
FIG. 4 shows the structure of an example event fragment.

The node 110 that orders the events can be referred to as an upward node that receives data related to events, e.g., in the form of event fragments, from the other nodes 120. In some implementations, the node 110 is a consumer node that consumes events and performs actions based on the events, or another node in the network that is tasked with event ordering. Each node 110 and 120 can be a computer or other type of device that sends and receives data in the distributed computing system 110. The nodes 120 can process events and send event data for events, e.g., in the form of event fragments, to other nodes 120 in the distributed computing system 100. At least some of the nodes 120 can send event fragments to the upward node 110. For ease and clarity of subsequent description, event data is described as being sent in the form of event fragments and an example event fragment is shown in FIG. 4 and described below. However, event data can be sent in other forms as well.

The upward node 110 includes an event ordering engine 112 that is configured to determine the order of the events corresponding to the event fragments based on data in the event fragments. The upward node 110 can store the event fragments and data that indicates the order of the events in episodic memory 130. The episodic memory 130 can be in the form of one or more hard drives, cloud computing data storage, flash drives, and/or other types of data storage devices.

In some implementations, the event ordering engine 112 can order events based on an assumption that there is no latency, e.g., no delay or uncertainty, in transmitting event fragments. That is, there is an assumption that there are no network delays in transmitting event fragments between nodes, no application delays, and no waiting at nodes, e.g., no waiting for the event data for events to processed at the nodes. In some implementations, the event ordering engine 112 orders events using techniques that account for latency, e.g., the various delays and uncertainty in the distributed computing system 100. Determining the order of events can include determining a causal event order by sorting the events in the order of their occurrence (e.g., their creation) from the perspective of the upward node 110.

Example Zero Latency Approaches

Figure 2:
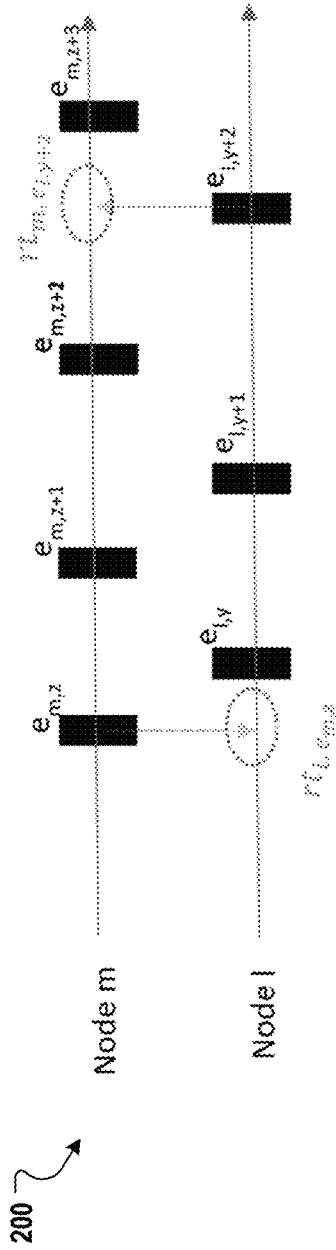
FIG. 2 is a diagram that shows an example event sequence for events that occur at nodes of a distributed system.
Figure 3:
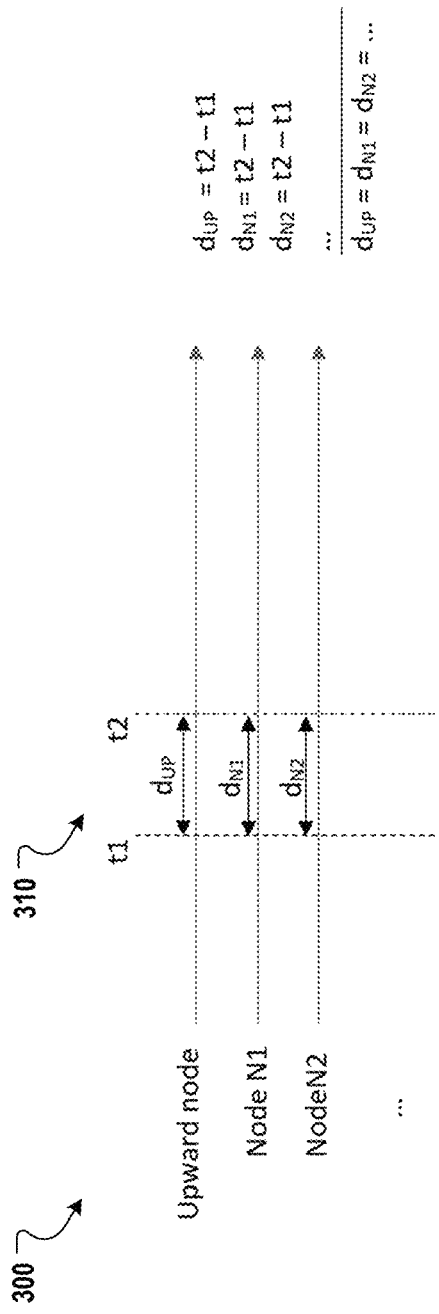
FIG. 3 is a diagram that shows equal time differences for multiple nodes of a distributed system.

FIGS. 2 and 3 are diagrams that show some assumptions that are made in some no latency approaches described in this document. A first assumption is that there is no delay in the system and a second assumption is that there is no time dilation in the system, or the time dilation is very negligible if any. The approaches can be used in implementations in which there are latencies, but the approaches are used to order events under the assumption that there are no latencies or time dilations or that the latencies and time dilations are negligible. In general, time dilation is a difference in elapsed time measured by two different clocks, e.g., clocks of different nodes.

FIG. 2 is a diagram that shows an example event sequence 200 for events that occur at nodes of a distributed system. In this example, it is assumed that there is no delay or uncertainty in any format in the distributed computing system. For example, this assumes that there are no delays in sending data over the network, no delays caused by applications, and no delays waiting for nodes to send data that is ready to be sent. If there is an event at node m, the appropriate event fragment is created at the same time that the event occurs and the event fragment broadcasted to neighbor nodes, e.g., node l, at the same time that the event occurs. Node l will also receive the event fragment at the same time that the event occurs. In this example, $e_{m,z}$ represents event #z at node m and $rt_{l,e_{m,z}}$ represents the received time for an event fragment for event #z at node l. In this example, the two times are equal since there is no latency in transmitting the event fragment for the event. In other words, the event fragment for event #z was received at node l at the same time that event #z occurred and at the same time that the event fragment for event #z was sent from node z.

Similarly, when an event occurs at node l, node l can send an event fragment to node m with event data for the event. For example, $e_{l, y+2}$ represents event #y+2 at node l and $rt_{l, e_{l,y+2}}$ represents the received time for an event fragment for event #y+2 at node m. Again, the two times are equal since there is no latency in transmitting the event fragment for the event.

FIG. 3 is a diagram that shows equal time differences 300 for multiple nodes of a distributed system. That means the duration between time t2 and time t1 (e.g., t2−t1) in all nodes including the upward node should be equal or at least close to equal, e.g., within a threshold such that the difference is negligible. In other words, there is no time dilation, or it very negligible, if any. In this example, the calculated age time, as described below, in any node is equal to a duration of time (in the upward node perspective), from the time the event occurred to the received time at the upward node (UP). The received time at the upward node is the time at which the event fragment for the event is received at the upward node.

FIG. 4 shows the structure of an example event fragment 400. The event fragment 400 can have a particular structure that corresponds to a temporal disentanglement protocol used by nodes of distributed systems to send event data to other nodes. A node can send an event fragment for an event to other nodes, e.g., to neighboring nodes that neighbor the node in the distributed system. One or more nodes can also send event fragments to an upward node that determines the order of the events corresponding to the event fragments.

The event fragment 400 includes an operation domain action pair data field 405, an origin data field 410, a sequence data field 415, an age data field 420, a geolocation metadata field 425, additional customizable metadata fields 430-1-430-N, and payload data 435. The operation domain action pair field 405 can include data identifying the operation of the event and the domain on which the event occurred. The origin data field 410 can include origin data that identifies the node at which the event occurred, e.g., using a node identifier for the node. The sequence data field 415 includes sequence data that can be used to arrange the event corresponding to the event fragment 400 in a sequence with other events. In some implementations the sequence data for an event is a combination of a timestamp (e.g., in milliseconds) and Lamport clock, LP. The age data field 420 includes age data, e.g., in the form of an age parameter, that represents the age of the event at the time the event fragment 400 is sent to the upward node from the perspective of the node that sends the event fragment 400 to the upward node.

Each Node $N_i$ in a distributed system maintains a monotonically increasing sequence $Seq_i$ which is a combination of timestamp $C_i$ (in milliseconds) and Lamport clock, LP. This sequence $Seq_i$ can be included in the sequence data field 415 of the event fragment. The timestamp can be based on a current time of a clock of the node that is sending the event fragment. The Lamport clock is an algorithm used to determine the order of events in a distributed system. For example, in a multi-process distributed environment, each process can have a single timestamp counter. The value of this counter is incremented before assigning it to each new event. When the event is received by another process, the recipient's counter is updated to the maximum value between its current counter and the received timestamp counter. The resulting number is then incremented by a value of one. This approach resolves same-millisecond collisions between different processes.

When an event z occurs at Node $N_i$, the node $N_i$ can set the sequence $Seq_i(e)$ to be the time of the current timestamp $C_i$+LP of zero. The event z can be represented as $e_{Ni,z}$ to identify the node $N_i$ and the event z at the node Ni. If there is more than one event that occurred with the same timestamp $C_i$, the Lamport clock LP will be increased by one for each event that occurred with the same timestamp $C_i$. A node sends the event's $e_{Ni,z}$ fragment to the (e.g., selected list of) neighbor nodes, e.g., using multicast. As shown in FIG. 4, each event fragment includes an origin, an operation, and a sequence—$Seq_i$ ($e_{Ni,z}$). When the event fragment is received at another node, $N_j$, the node $N_j$ will record the received time, e.g., the local time based on a local clock of node $N_j$, of the fragment. This received time can be represented as $rt_{Nj, e_{Ni,z}}$ to identify the node $N_j$ and the event $e_{Ni,z}$.

The node $N_j$ adds the received event fragments that it received from neighbor nodes, along with its own events, to a queue, $Q_{Nj,k}$. The node $N_j$ can periodically, or when able, send the event fragments stored in the queue $Q_{Nj,k}$ to the upward node. The parameter k is used to show $k^{th}$ time to add the received event fragments and events into the queue $Q_{Nj,k}$ and broadcast the event fragments to the upward node. Just before sending the event fragments in the queue to the upward node, the node $N_j$ can calculate the age for all events that have an event fragment in the queue $Q_{Nj,k}$. The node $N_j$ can add the age for an event to the age date field 420 of its event fragment before sending the event fragment 400 to the upward node.

The send time for an event can be represented as $st_{Nj, k}$, which indicates that the send time is at $k^{th}$ time and is for an event fragment sent by the node $N_j$. A node, e.g., node Nj, can determine the age for an event based on the send time for its event fragment and either (i) the time the event fragment was received if the event fragment was received from another node or (ii) the timestamp for the event if the event occurred at the node that is determining the age of the event. For node $N_j$, the age for events of event fragments received from node $N_i$ can be determined using Equation 1 below:

$$Age_{e_{Ni,z}} = St_{Nj,k} - rt_{Nj,e_{Ni,z}} \qquad \text{Equation 1:}$$

In Equation 1, $Age_{e_{Ni,z}}$ represents the age of event z that occurred at node $N_i$, $st_{Nj, k}$ represents the send time at which node $N_j$ is sending the event fragment for event z at node $N_i$, and $rt_{Nj, e_{Ni,z}}$ represents the received time that node $N_j$ received the event fragment for event z from node $N_i$.

For node $N_j$, the age for its own events, e.g., events that occurred at node $N_j$, can be determined using Equation 2 below:

$$Age_{e_{Nj,y}} = St_{Nj,k} - C_{j,e_{Nj,y}} \qquad \text{Equation 2:}$$

In Equation 2, $Age_{e_{Nj,y}}$ represents the age of event y that occurred at node $N_j$, $st_{Nj, k}$ represents the send time at which node $N_j$ is sending the event fragment for event y at node $N_j$, and $C_{j, e_{Nj,y}}$ represents the timestamp for event y as determined by node $N_j$, e.g., using a local clock of node $N_j$.

To calculate the age $Age_{e_{Nj,y}}$ for event y, node $N_j$ can use the timestamp $C_{j, e_{Nj,y}}$ part of its full sequence which contains the timestamp of the creation of the event, e.g., in milliseconds. The Lamport Time can be used in addition to the timestamp when there is more than one event at the same millisecond, so that the events can be differentiated.

The upward node calculates the disentangled time (DT) for each event fragment according to the upward node time, e.g., using a local clock of the upward node, and the received time of the event fragment in the send queue of the upward node. The received time for an event fragment can be represented as $rt_{UP, Q_{Nj,k}}$, which indicates that the received time is based on the upward node's clock and is for an event fragment received from node $N_j$. The upward node can determine the disentangled time for the event corresponding to the event fragment using Equation 3 below:

$$DT_{e_x} = rt_{UP,Q_{Nj,k}} - Age_{e_x}$$  Equation 3:

In Equation 3, $DT_{e_x}$ represents the disentangled time for an event corresponding to event fragment x, $rt_{UP, Q_{Nj,k}}$ represents the received time for this event fragment, and $Age_{e_x}$ represents the age for the event corresponding to the event fragment. This calculation is possible due to the assumption that there is no (or little) time dilation between all nodes in the distributed system. The upward node arranges the events in order based on their disentangled times. If the disentangled time $DT_{e_{Ni,z}}$ for event z at node Ni is less than the disentangled time $DT_{e_{Nj,y}}$ for event y at Node $N_j$, then event z at node N, ($e_{Ni,z}$) happened before event y and Node N, ($e_{Nj,y}$). If the disentangled times are equal ($DT_{e_{Ni,z}} = DT_{e_{Nj,y}}$), then the events $e_{Ni,z}$ and $e_{Nj,y}$ happened at the same time.

Figure 5:
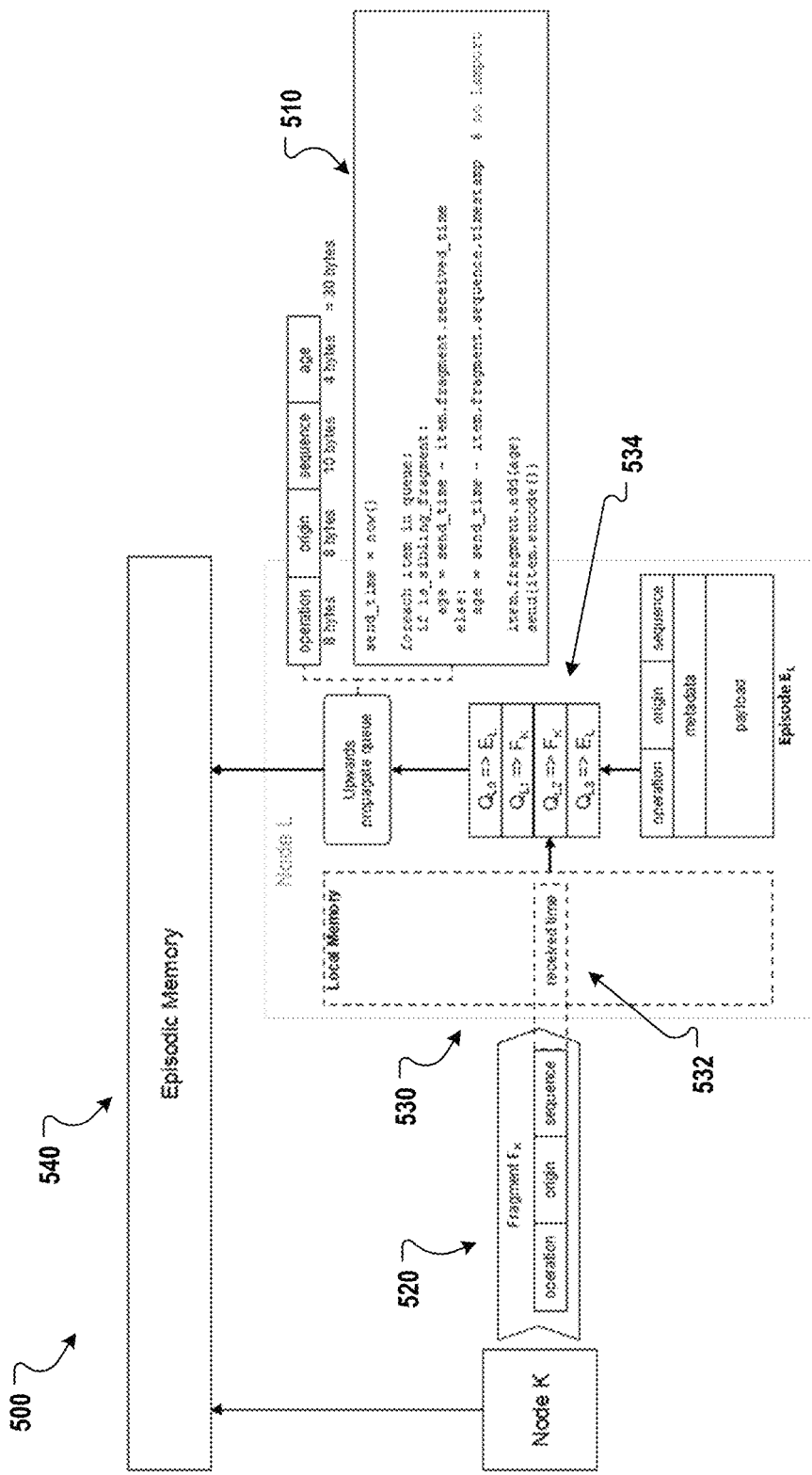
FIG. 5 shows an example data flow for receiving an event fragment and determining the age for events at the recipient node.

FIG. 5 shows an example data flow 500 for receiving an event fragment and determining the age for events at the recipient node. The data flow 500 is shown using an example architecture of fragment broadcasting between nodes K and L.

Node K sends an event fragment 520 for an event FX that occurred at node K. The event fragment 520 can include the same structure as the event fragment 400 of FIG. 4. When node L receives the event fragment 520, node L can store the event fragment 520 in local memory 530 and records a received time 532 for the event fragment 520 in local memory. The received time can be the local time based on a local clock of node L. Node L can also place the event fragment in a queue 534 of event fragments to be sent to an upward node that can determine the disentangled time for each event and store the event fragments in episodic memory 540.

Node L maintains the queue 534 of event fragments and calculates the age of the events for the event fragments when propagating the event fragments to an upward node, e.g., an upward node that updates the episodic memory 540. The environment 500 can include additional nodes that send event fragments to node L and/or to other nodes that use a queue to propagate event fragments to an upward node.

Node L can use an algorithm 510 to determine the age for each event for which an event fragment is stored in the queue 534. If the event fragment is a sibling event fragment received from another node, Node L can determine the age for the event of the event fragment using the send time at which Node L is sending the event fragment to the upward node and the received time for the event fragment, e.g., using Equation 1 above. If the event fragment is for an event that occurred at Node L, Node L can determine the age for the event of the event fragment using the send time at which Node L is sending the event fragment to the upward node and the timestamp for the event, e.g., using Equation 2 above. After determining the ages, Node L can add the ages to their respective event fragments and send the event fragments to the upward node and/or to episodic memory 540.

Figure 6:
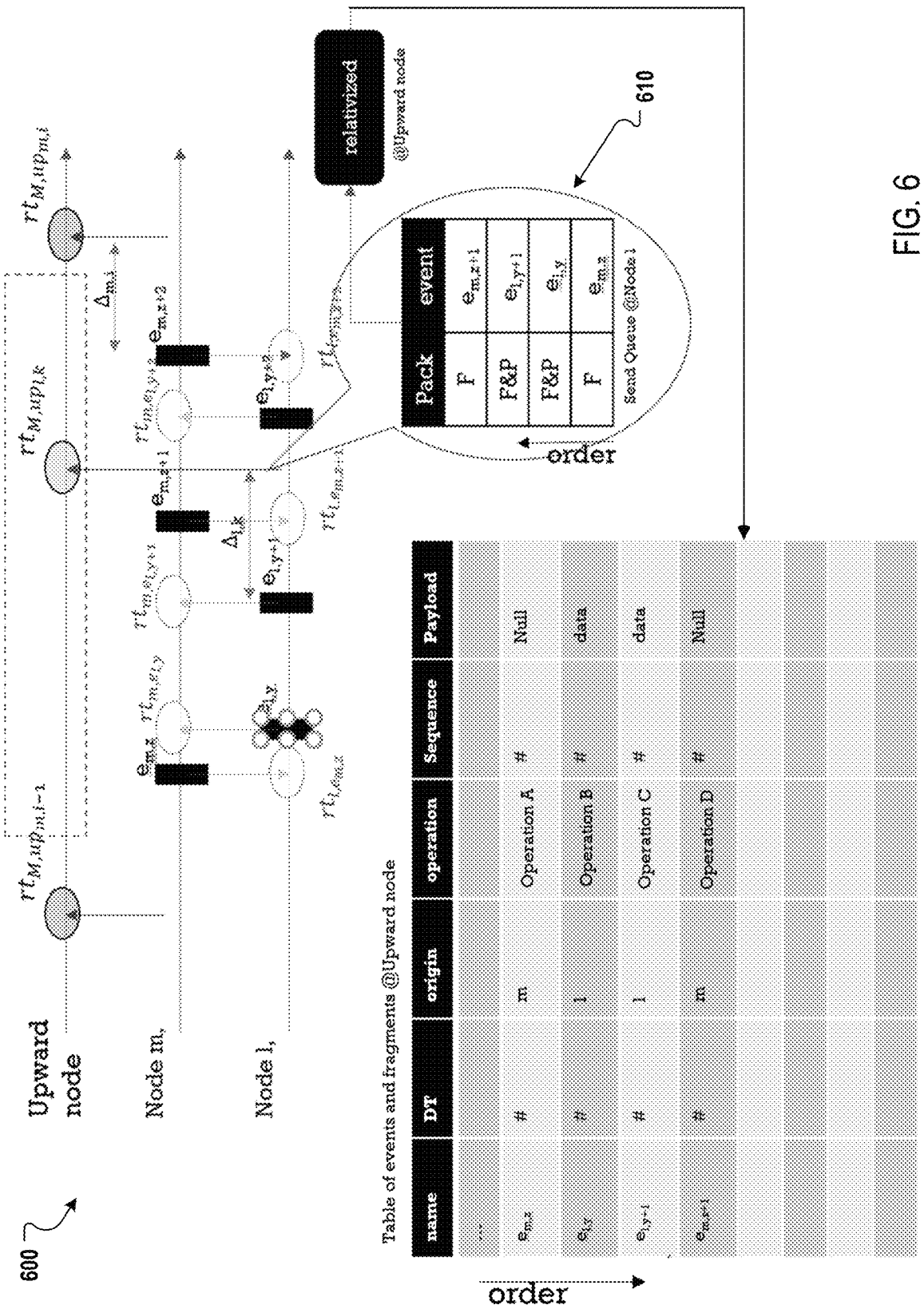
FIG. 6 is a diagram that shows an example event sequence for events that occur at nodes of a distributed system.

FIG. 6 is a diagram that shows an example event sequence 600 for events that occur at nodes of a distributed system. This figure illustrates a case in which Node l is broadcasting its send queue 610 with two event fragments for events of its own ($e_{l,y}$ and $e_{l,y+1}$) and two event fragments received from Node m, (event fragments for events $e_{m,z}$ and $e_{m,z+1}$) to an upward node. At the upward node, the upward node can determine the disentangled time (DT) of each event fragment using the received time ($rt_{M,up_{l,k}}$) for the events in the send queue 610 and their respective ages. Two noteworthy parts of each element of the table in FIG. 6 are the origin (e.g., the node at which the event occurred) and the sequence. The payload part can be empty or null until the upward node receives the event fragment and its payload from the originating node of that event.

Impact of Fragment-Event Broadcasting Ratio and Multicast Factor on Network Load and N-Guarantee The following discussion evaluates the impact of fragment-event broadcasting ratio and multicast factor on network load and n-guarantee. The n-guarantee is defined as a minimum number "n" of event fragments needed in the upward node to calculate the disentangled time with desired, defined, and/or target confidence. For the purpose of this evaluation, the following parameters are defined in Table 1:

| Parameter | Definition |
| --- | --- |
| $r_i$ | Rate of event at node i (per second) |
| $f_i$ | Ratio of event fragment over event broadcast at node i |
| $m_i$ | Multicast factor (to how many neighbor nodes) |
| prob_$f_i$ | Probability of neighbor nodes received fragment (lost connection) |
| $n_i$ | Number of neighbor nodes of node i sending fragments to node i |
| $upb_i$ | Upward broadcast rate node i (per second) |
| $prob_{upi}$ | Probability of upward node receiving all elements of a send queue at node i (lost connection) |

Figure 7:
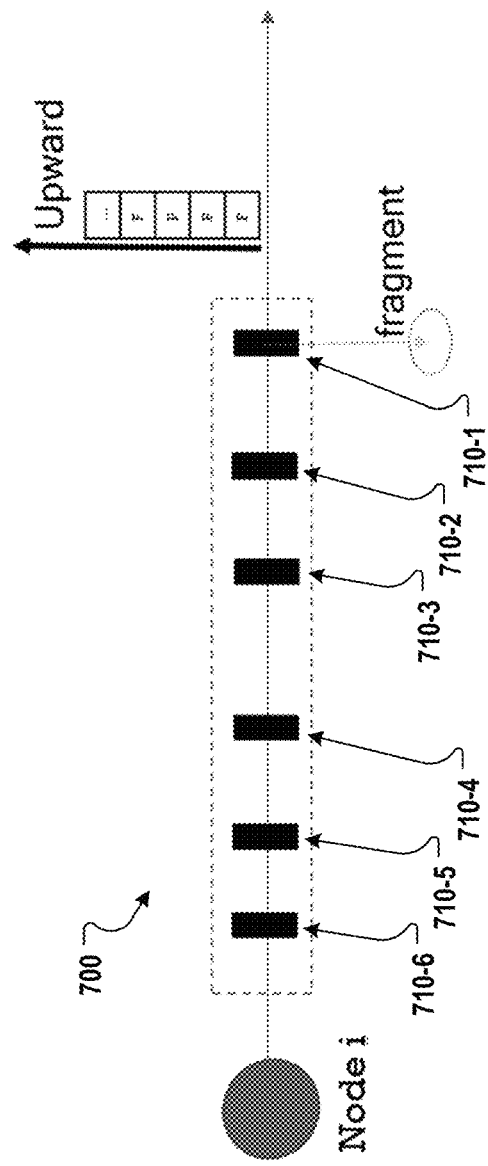
FIG. 7 shows an example sequence of event fragments broadcast by a node.

FIG. 7 shows an example sequence 700 of event fragments broadcast by a node, Node i. A number of event fragments 710, e.g., event fragments 710-1 to 710-6) can be generated and broadcasted by Node i equal to $r_i + (f_i * r_i * m_i)$, which includes $r_i$ events per second and $f_i$ $r_i$ $m_i$ event fragments broadcasted by Node i to $m_i$ neighbor nodes. Each neighbor node will receive a given event fragment from Node i with a probability of prob_$f_i$. In this example, the number of event fragments that will be added to the send queue of neighbor nodes by Node i is equal to: prob_$f_i * f_i * r_i * m_i$.

The same technique can be used to evaluate the number of elements (e.g., event fragments) added to the send queue of Node i per second assuming Node i has $m_i$ neighbors. In this example, the number elements added to the send queue of Node i per second can be determined using Equation 4 below:

$$\text{Elements} = Er_i + \sum_{\substack{\text{neighbors of} \\ \text{node } i}} \text{prob\_}f_k * f_k * r_k \quad \text{Equation 4}$$

Having prob_$up_i$ and knowing that Node i will broadcast to the upward node every $$\frac{1}{upb_i}$$

second, the number of elements (e.g., event fragments) will be added to the table and/or episodic memory of the upward node by Node i per second can be estimated using Equation 5 below:

$$\text{Elements} = \text{prob\_up}_i \frac{1}{upb_i}\left(r_i + \sum_{\substack{neighbors\ of \\ node\ i}} \text{prob\_f}_k * f_k * r_k\right) \quad \text{Equation 5}$$

Finally, the total number of elements (e.g., event fragments) expected to be received at the upward node from all nodes in the network per second can be estimated using Equation 6 below:

$$\text{Elements} = \sum_{nodes} \text{prob\_up}_i \frac{1}{upb_i}\left(r_i + \sum_{\substack{neighbors\ of \\ node\ i}} \text{prob\_f}_k f_k r_k\right) \quad \text{Equation 6}$$

Figure 8:
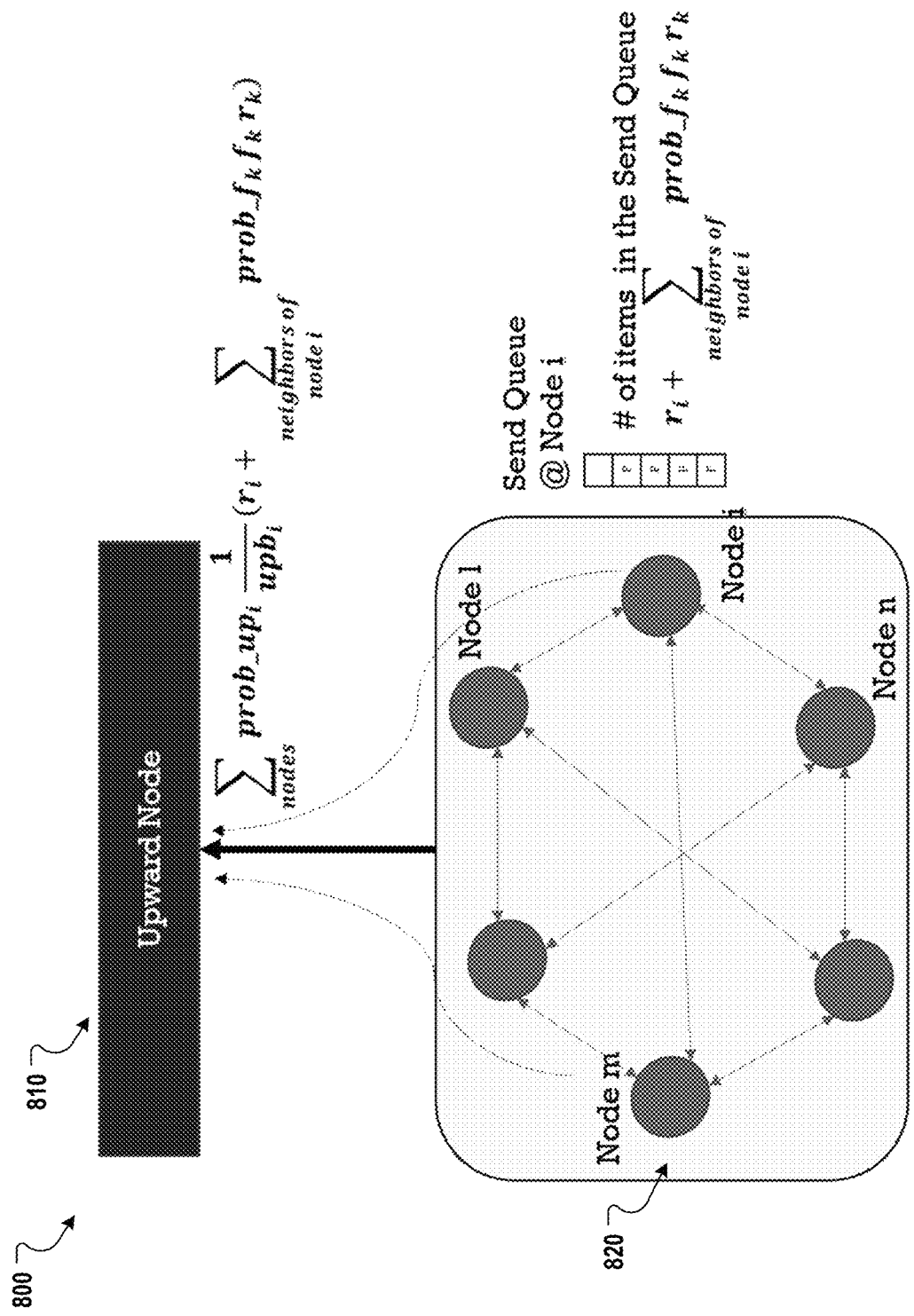
FIG. 8 shows an example environment in which an upward node orders events.

FIG. 8 shows an example environment 800 in which an upward node 810 orders events of event fragments received from nodes 820. To support n-guaranteed, there should be a minimum number of neighbor nodes to receive the event fragments from a specific node, e.g., Node i. For example, to have 1-guaranteed, at least one of the neighbor nodes should receive the event fragment ($F_{i,10}$) from Node i with target confidence ($Pr(F_{i,10})$) determined using Equation 7 below:

$$Pr(F_{i,10}) = \bigcup_{\substack{x \in\ neighbors\ of \\ node\ i}} \text{prob\_f}_{i \to x} \quad \text{Equation 7}$$

Figure 9:
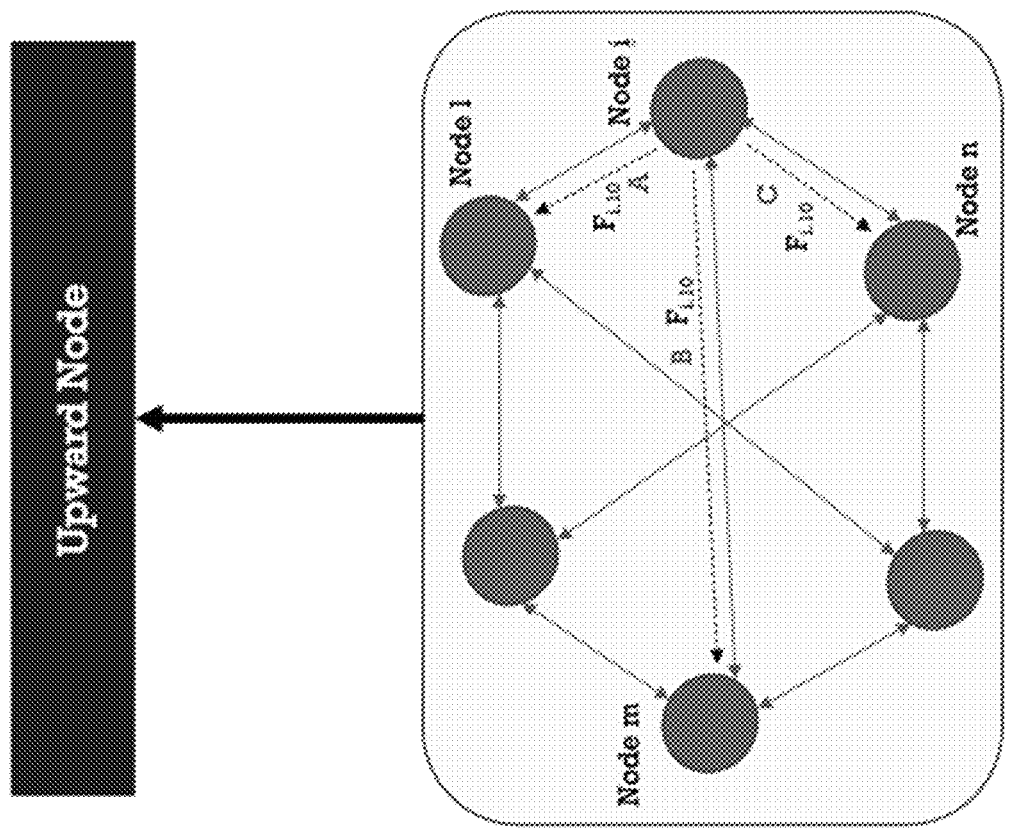
FIG. 9 shows an example environment in which a node orders events.

Considering the example environment 900 of FIG. 9, $Pr(F_{i,10})$ of 0.999 can be evaluated if probability of a successful communication between Node i and its neighbor nodes (A, B and C) is 0.9, which can be determined using Equation 8 below:

$$Pr(A \cup B \cup C) = Pr(A) + Pr(B) + Pr(C) - Pr(AB) - Pr(AC) - Pr(BC) + Pr(ABC) \quad \text{Equation 8:}$$

In the case of 2-guaranteed, there should be at least two of neighbor nodes {l, m, n} of Node i that receive the fragment ($F_{i,10}$). $Pr(F_{i,10})$ of 0.972 can be evaluated using Equation 9 below:

$$\text{Equation 9}$$
$$Pr(AB \cup AC \cup BC) = 1 - Pr(\text{none received}) - Pr(\text{exactly one reveived})$$
$$= 1 - (A'B'C') - (AB'C' + A'BC' + A'B'C)$$

The probability of 1-guaranteed and 2-guaranteed can be estimated at the upward node which means at least one or two of the neighbor nodes received the fragment ($F_{i,0}$) and has/have successful upward broadcast. These probabilities can be estimated using Equations 10 and 11 below:

1-guaranteed: $Pr((A \cup B \cup C \cup))$ \quad Equation 10:

2-guaranteed: $Pr((A \cap B \cup) \cup (A \cap C \cup) \cup (B \cap C \cup))$ \quad Equation 11:

Example Approaches that Account for Latency

In this section, latency and delay in a distributed system and how such latency is accounted for when ordering are described. The latency can be from networking (e.g., transmitting data across a network), buffering event data and/or event fragments, application delays, and/or other latency sources. If there is an event at Node m, the appropriate fragment will be created and broadcast to neighbor nodes, e.g., Node l. The event fragment will be received at Node l with some delay Δ. The same assumption applies to the upward broadcasting of the send queue to the upward node as well.

In general cases, it was assumed that all elements of the send queue will be broadcasted at the same time, e.g., the queue of Node m with $st_{m,\ i-1}$, and will be received by upward node at the same time, $rt_{M,\ up_{m,i-1}}$. However, there could be some use cases and/or applications in which the send time and receive time are unique to each event fragment in the send queue. These assumptions are shown in FIG. 10, which shows an example event sequence 1000 for events that occur at nodes of a distributed system.

Figure 10:
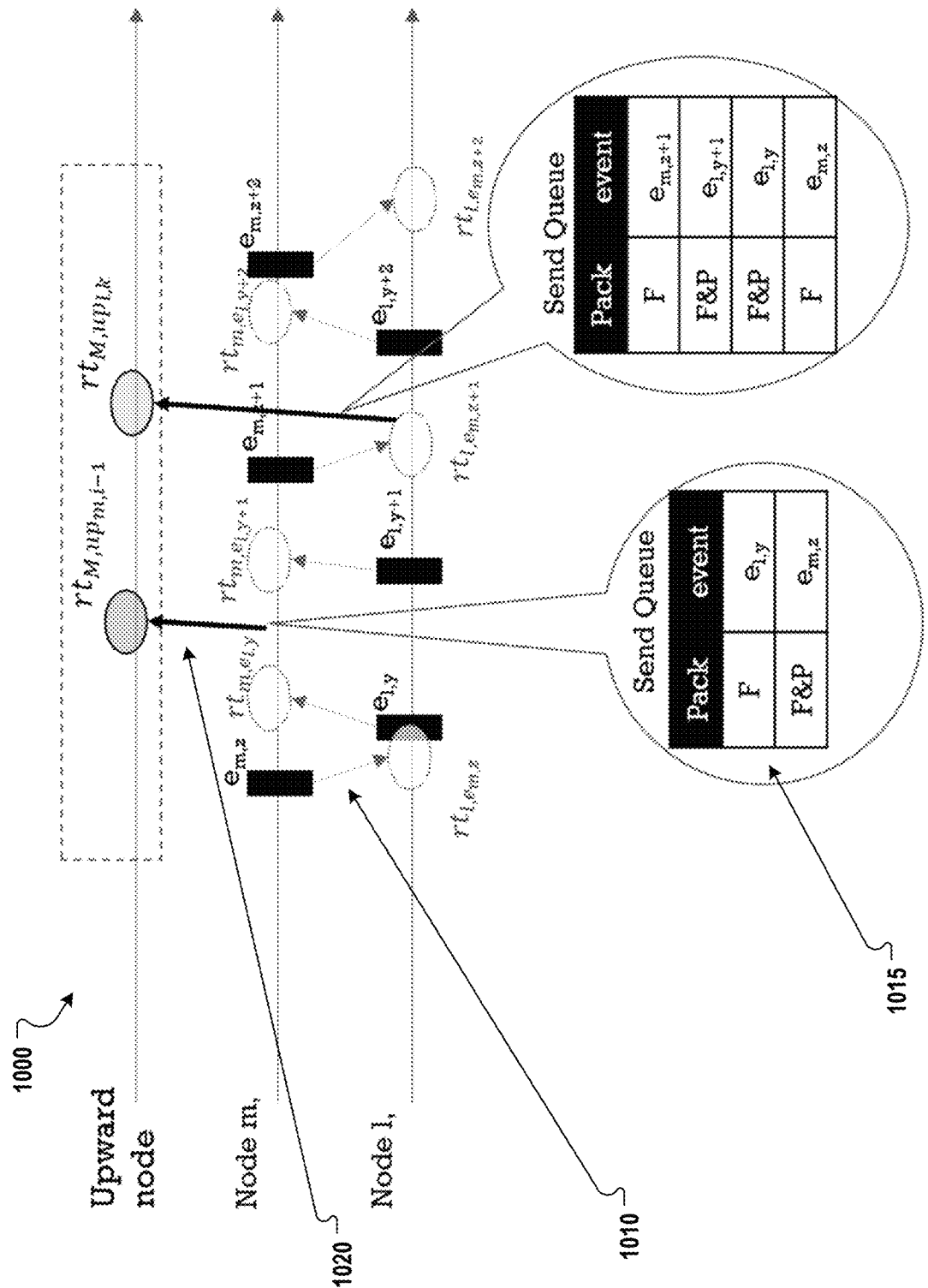
FIG. 10 is a diagram that shows an example event sequence for events that occur at nodes of a distributed system.

Referring to FIG. 10, Node m sends an event fragment for event z, $e_{m,z}$. Rather than being received by Node l at the same time that event z occurred at Node m, the event fragment for event z is received at Node l at time $rt_{l,e_{m,z}}$ after some time delay 1010. In addition, each event fragment of a send queue 1015 of Node l is received by the upward node after some time delay 1020 after being sent from Node l.

Figure 11:
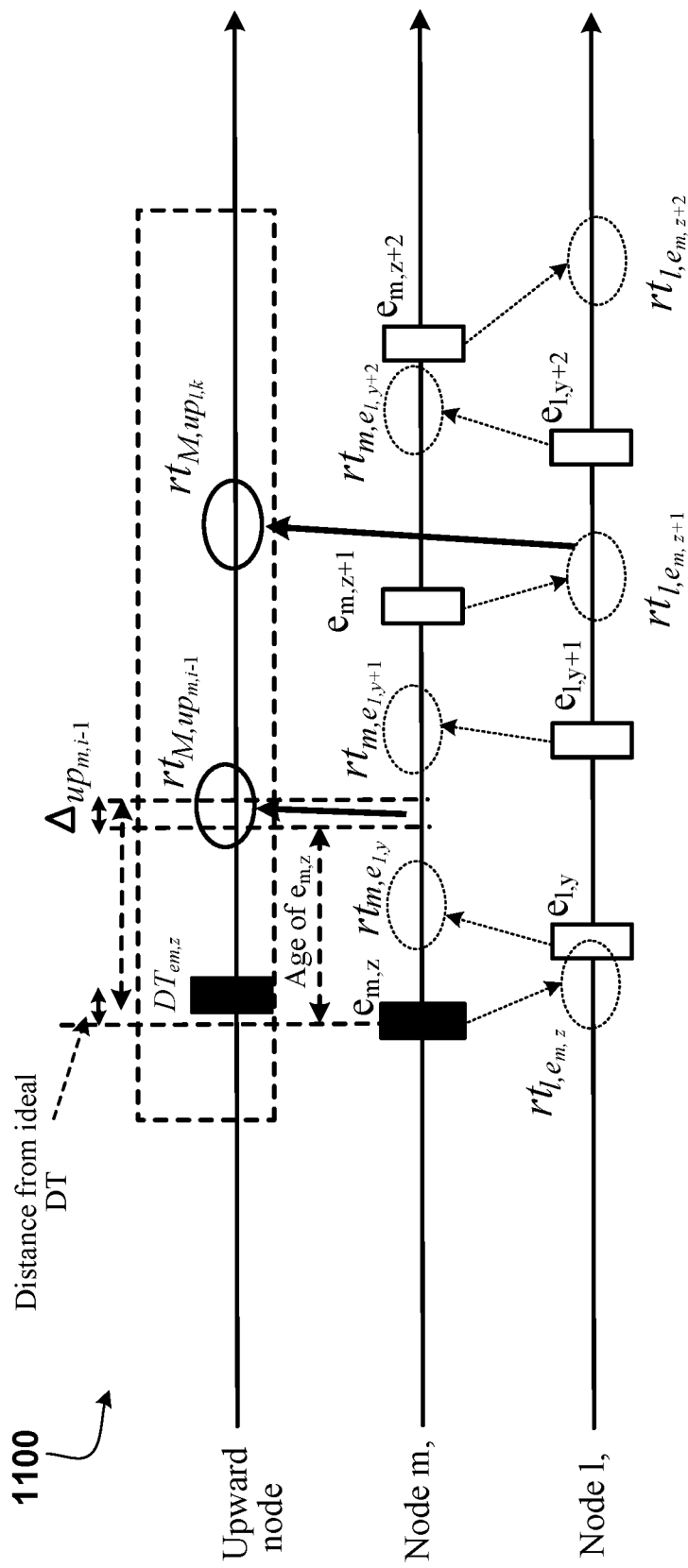
FIG. 11 is a diagram that shows an example event sequence for events that occur at nodes of a distributed system.

FIG. 11 is a diagram that shows an example event sequence 1100 for events that occur at nodes of a distributed system. The event sequence 1100 shows a case in which an event fragment for event z that occurred at Node m, $e_{m,z}$, was created at Node m and was broadcast to the upward node. There is going to be latency, $\Delta_{up_{m,i-1}}$, from the send time at Node m, $st_{m,\ i-1}$, until it received at upward node, $rt_{M,\ up_{m,i-1}}$, considering all various types of delay and latency in the distributed system. Note that $\Delta_{up_{m,i-1}}$ could be different for each element, e.g., event fragment, of the send queue. In an ideal case, the age of event $e_{m,z}$ should be as determined using Equation 12 below:

$$\text{Age} = st_{m,i-1} - C_{m,e_{m,z}} \quad \text{Equation 12:}$$

In Equation 12, $st_{m,\ i-1}$ represents the time that Node m sends the event fragment for event z and $C_{m,\ e_{m,z}}$ represents the timestamp for event z.

In this example, the disentangled time (DT) of event z, $e_{m,z}$, at the upward node can be determined using Equations 13 or 14 below:

$$DT_{e_{m,z}} = rt_{M,up_{m,i-1}} - \text{Age} \quad \text{Equation 13:}$$

$$DT_{e_{m,z}} = rt_{M,up_{m,i-1}} - (st_{m,i-1} - C_{m,e_{m,z}}) \quad \text{Equation 14:}$$

In Equations 13 and 14, $rt_{M,\ up_{m,i-1}}$ represents the received time at which the upward node receives the event fragment for event z and Age represents the age for event z, which can be determined using Equation 12 as shown in Equation 14.

To account for latency in the distributed system, the upward node can determine the age and disentangled time using Equations 15-17 below:

$$\text{Actual Age} = (st_{m,i-1} - C_{m,e_{m,z}}) + \Delta_{up_{m,i-1}} \quad \text{Equation 15:}$$

$$DT_{e_{m,z}} = rt_{M,up_{m,i-1}} - \text{Age} \quad \text{Equation 16:}$$

$$DT_{e_{m,z}} = rt_{M,up_{m,i-1}} - ((st_{m,i-1} - C_{m,e_{m,z}}) + \Delta_{up_{m,i-1}}) \quad \text{Equation 17:}$$

In Equation 15, $st_{m,\ i-1}$ represents the send time at which Node m sends, to the upward node, an event fragment for event z, $C_{m,\ e_{m,z}}$ represents the timestamp for event z as determined by Node m, and $\Delta_{up_{m,i-1}}$ represents the latency between the send time and the received time at which the upward node receives the event fragment for event z from Node m. The other parameters are the same as those in Equations 13 and 14. In this example, there would be a distance of $\Delta_{up_{m,i-1}}$ from ideal DT in the computed DT that accounts for latency.

Figure 12:
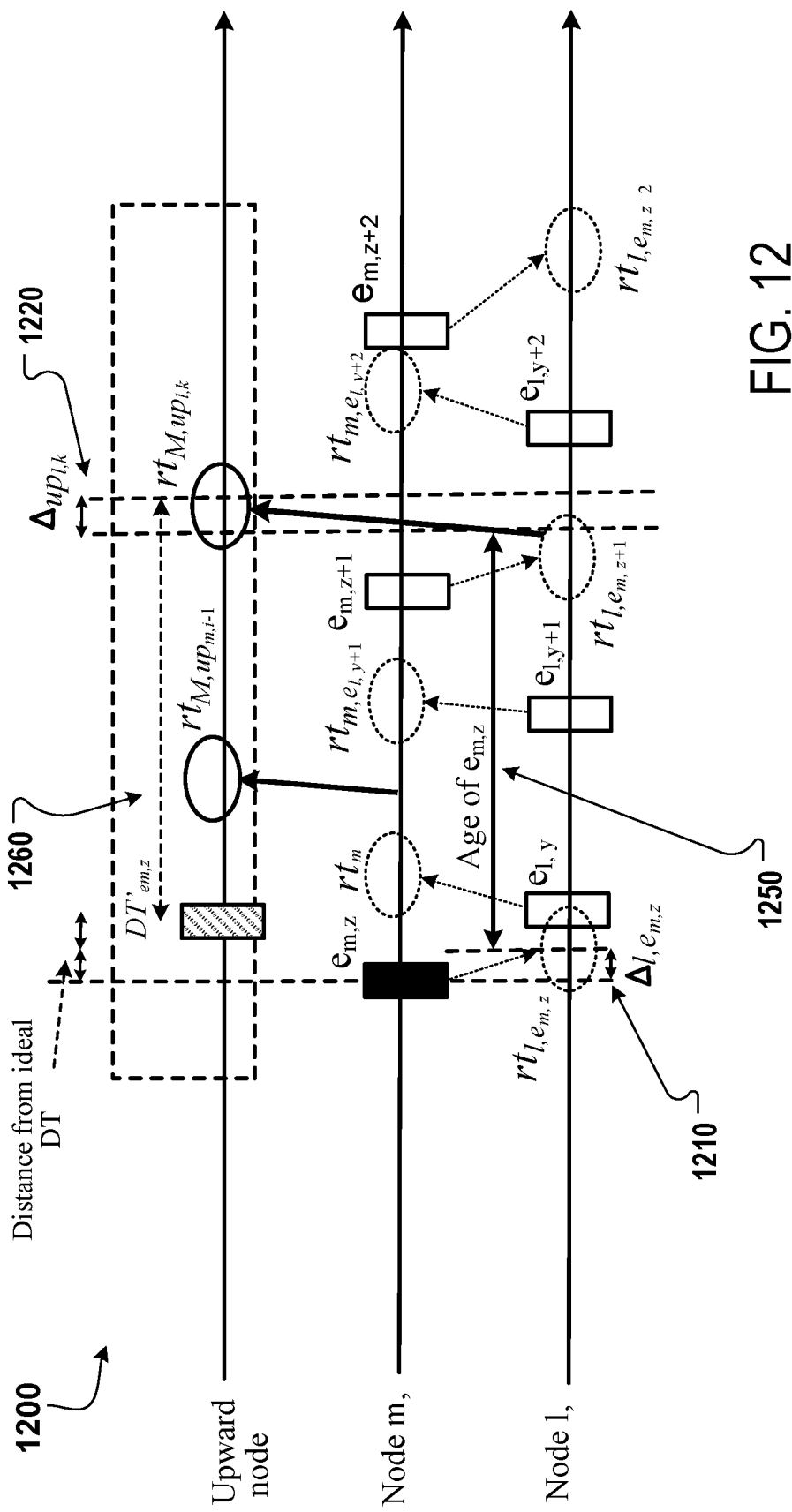
FIG. 12 is a diagram that shows an example event sequence for events that occur at nodes of a distributed system.

FIG. 12 is a diagram that shows an example event sequence 1200 for events that occur at nodes of a distributed system. The event sequence 1200 of FIG. 12 shows a case in which event z of Node m, $e_{m,z}$, is created and Node m sends, e.g., via multicast, the relevant event fragment for event z to Node l. Later, Node l broadcasts all elements of its send queue including the event fragment for event z, $e_{m,z}$, to the upward node. In this case, there will be two latencies associated with this event, $e_{m,z}$. One latency 1210, represented as $\Delta_{l,\,e_{m,z}}$, is the time difference between when Node m supposedly sends the event fragment, from the perspective of Node l, and the received time at which of the event fragment is received by Node l, which is represented as $rt_{l,\,e_{m,z}}$. Another latency 1220, represented as $\Delta_{up_{l,k}}$, is the time difference from the send time at Node l, represented as $st_{l,\,k}$ in the perspective of the upward node, until the event fragment is received at the upward node, represented as $rt_{M,up_{m,i-1}}$, considering all various types of delay and latency in the distributed system.

Similarly, if there is no latency, the ideal age of $e_{m,z}$ is shown in Equation 18 below:

$$\text{ideal Age} = st_{l,k} - rt_{l,e_{m,z}} \quad \text{Equation 18:}$$

In Equation 18, $st_{l,\,k}$ is the send time for the event fragment in the perspective of the upward node and $rt_{l,\,e_{m,z}}$ is the received time at which the event fragment is received at Node l.

The actual age 1250 and disentangled time (DT) 1260 for event z, $e_{m,z}$, when accounting for latency are represented by Equations 19-21 below:

$$\text{Age} = (st_{l,k} - rt_{l,e_{m,z}}) + \Delta_{l,e_{m,z}} + \Delta_{up_{l,k}} \quad \text{Equation 19:}$$

$$DT'_{e_{m,z}} = rt_{M,up_{l,k}} - \text{Age} \quad \text{Equation 20:}$$

$$DT'_{e_{m,z}} = rt_{M,up_{l,k}} - ((st_{l,k} - rt_{l,e_{m,z}}) + \Delta_{l,e_{m,z}} + \Delta_{up_{l,k}}) \quad \text{Equation 21:}$$

In Equation 19, the actual age is represented as the ideal age plus both sources of latency described above. In Equations 20 and 21, $rt_{M,\,up_{l,k}}$ is the received time at which the upward node receives the event fragment and the age is based on Equation 19. In this example, inaccuracy in the disentangled time DT calculation will be the sum of the delays, $\Delta_{l,\,e_{m,z}} + \Delta_{up_{l,k}}$, as the exact value of these parameters are unknown.

The following description defines example methods and techniques that reduce the impact of those latencies when determining the age and disentangled time for events in a distributed system. One or more of the methods can be used in any combination to account for latency in the distributed system.

In a first method, the impact of latency on the age of event fragments at the node level is reduced by finding the best age for each event fragment. This provides a more accurate disentangled time that reduces the impact of latencies in determining the disentangled time.

Figure 13:
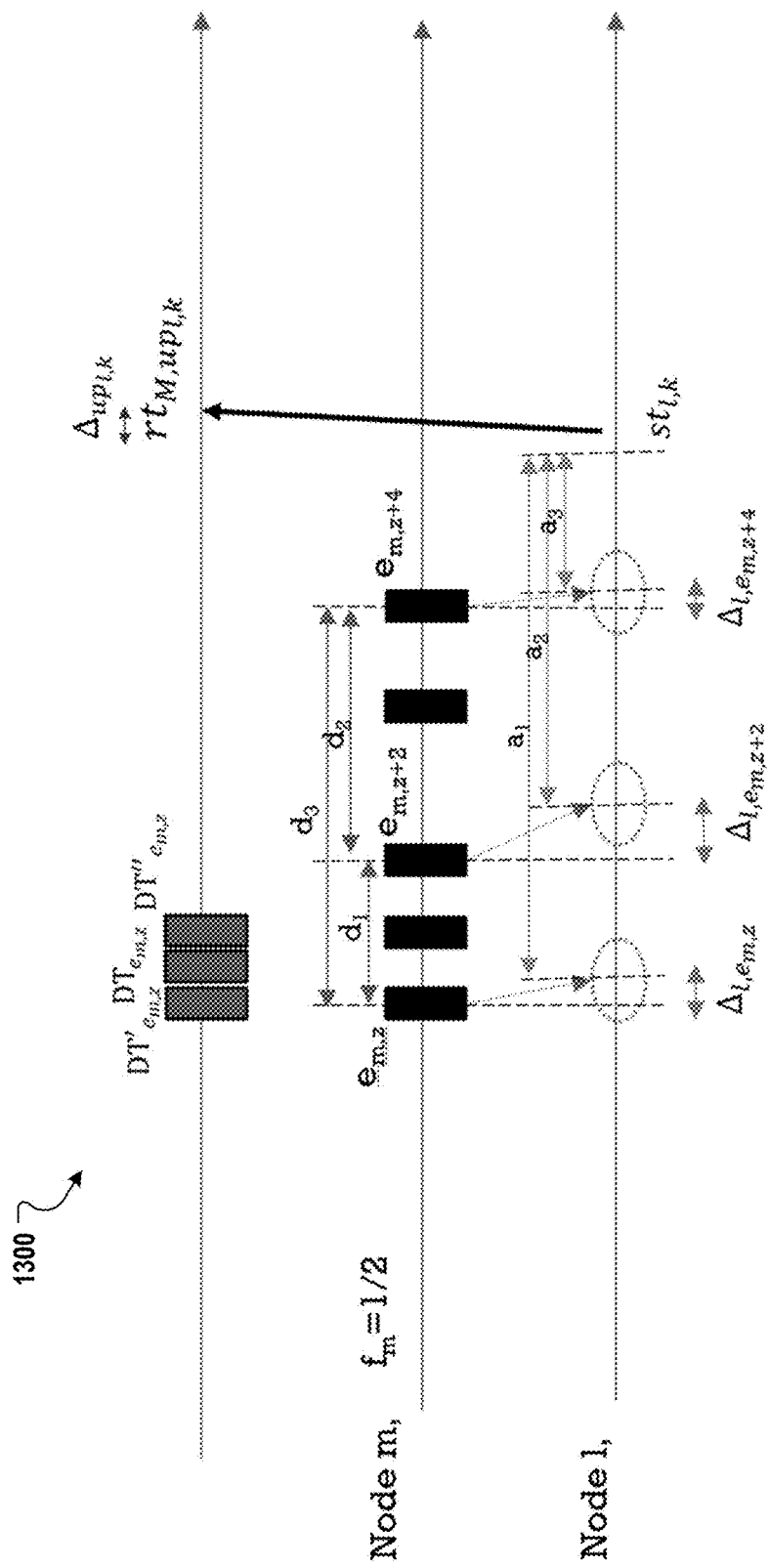
FIG. 13 is a diagram that shows an example event sequence for events that occur at nodes of a distributed system.

In FIG. 13, which shows an example event sequence 1300 for events that occur at nodes of a distributed system, it can be seen that Node m is sending, e.g., multicasting, three event fragments for three events $e_{m,z}$, $e_{m,z+2}$ and $e_{m,z+4}$, out of six total events ($f_m = 1/2$) to Node l.

The time difference between each pair of events, $d_1$, $d_2$ and $d_3$ can be defined using Equations 22-24 below:

$$d_1 = C_{m,e_{m,z+2}} - C_{m,e_{m,z}} \quad \text{Equation 22:}$$

$$d_2 = C_{m,e_{m,z+4}} - C_{m,e_{m,z+2}} \quad \text{Equation 23:}$$

$$d_3 = C_{m,e_{m,z+4}} - C_{m,e_{m,z}} \quad \text{Equation 24:}$$

In these equations, the time difference $d_1$ is the time difference between events $e_{m,z}$ and $e_{m,z+2}$, the time difference $d_2$ is the time difference between events $e_{m,z+2}$ and $e_{m,z+4}$, and the time difference $d_3$ is the time difference between events $e_{m,z}$ and $e_{m,z+4}$. Each time difference can be determined based on the difference between the timestamps $C_m$ for the two events, as shown in Equations 22-24.

The age of event $e_{m,z}$ can be computed in three ways. One example way is using its received time of the fragment at Node l and the send time of the $k^{th}$ element in the queue to the upward node using Equation 25 below:

$$\text{age}_{e_{m,z}} = st_{l,k} - rt_{l,e_{m,z}} \quad \text{Equation 25:}$$

In Equation 25, $\text{age}_{e_{m,z}}$ represents the age of event $e_{m,z}$, $st_{l,\,k}$ represents the send time of the $k^{th}$ element in the queue to the upward node, and $rt_{l,\,e_{m,z}}$ is the received time at which Node l received the event fragment for event $e_{m,z}$.

Two additional ways of determining the age of event $e_{m,z}$ use the ages of events $e_{m,z+2}$ and $e_{m,z+4}$, and time differences $d_2$ and $d_3$, respectively, as shown in Equations 26 and 27 below:

$$\text{age}'_{e_{m,z}} = \text{age}_{e_{m,z+2}} + d_1 = (st_{l,k} - rt_{l,e_{m,z+2}}) + d_1 \quad \text{Equation 26:}$$

$$\text{age}''_{e_{m,z}} = \text{age}_{e_{m,z+4}} + d_3 = (st_{l,k} - rt_{l,e_{m,z+4}}) + d_3 \quad \text{Equation 27:}$$

In FIG. 13, $a_1$, $a_2$ and $a_3$ represent $\text{age}_{m,z}$, $\text{age}_{e_{m,z+2}}$ and $\text{age}_{e_{m,z+4}}$, respectively. That is, $a_1$, $a_2$ and $a_3$ represent the ages of events $e_{m,z}$, $e_{m,z+2}$ and $e_{m,z+4}$, respectively. In Equation 26, the age of event $e_{m,z}$ is determined based on the sum of the age of event $e_{m,z+2}$, represented as $\text{age}_{e_{m,z+2}}$, and the time difference $d_1$ between events $e_{m,z}$ and $e_{m,z+2}$. The age of event $e_{m,z+2}$ can be determined based on the send time $st_{l,\,k}$ of the $k^{th}$ element in the queue to the upward node and the received time $rt_{l,\,e_{m,z+2}}$ of the event fragment for the event $e_{m,z+2}$ at which Node l received the event fragment for event $e_{m,z+2}$.

In Equation 27, the age of event $e_{m,z}$ is determined based on the sum of the age of event $e_{m,z+4}$, represented as $\text{age}_{e_{m,z+4}}$, and the time difference $d_3$ between events $e_{m,z}$ and $e_{m,z+4}$. The age of event $e_{m,z+4}$ can be determined based on the send time $st_{l,\,k}$ of the $k^{th}$ element in the queue to the upward node and the received time $rt_{l,\,e_{m,z+4}}$ of the event fragment for the event $e_{m,z+4}$ at which Node l received the event fragment for event $e_{m,z+4}$.

At the upward node, the disentangled times (DTs) of all events corresponding to the event fragments can be computed using the determined ages. As described above, the determined ages can be included in the event fragments for the events. Because of an unknown amount of latency, there is going to be some distance from ideal disentangled times. The upward node can determine the disentangled times for each event using Equations 28-30 below. To the right of each equation, the distance from the ideal disentangled time for the event is show.

$$DT_{e_{m,z}} = rt_{M,up_{l,k}} - a_1; \Delta_{l,e_{m,z}} + \Delta_{up_{l,k}} \quad \text{Equation 28:}$$

$$DT_{e_{m,z+2}} = rt_{M,up_{l,k}} - a_2; \Delta_{l,e_{m,z+2}} + \Delta_{up_{l,k}} \quad \text{Equation 29:}$$

$$DT_{e_{m,z+4}} = rt_{M,up_{l,k}} - a_3; \Delta_{l,e_{m,z+4}} + \Delta_{up_{l,k}} \quad \text{Equation 30:}$$

In Equation 28, the disentangled time $DT_{e_{m,z}}$ for event $e_{m,z}$ is determined based on the received time $rt_{M,\,up_{l,k}}$ that the upward node received the event fragment for $e_{m,z}$ based on the upward node's clock and the age $a_1$ for the event $e_{m,z}$. The distance from the ideal disentangled time for the event $e_{m,z}$ is the sum of the delay between the time that Node m sends the event fragment for the event $e_{m,z}$ to Node l and the time that Node l received the event fragment, which is represented as $\Delta_{l,\ e_{m,z}}$, and the delay between the time that Node 1 sends the event fragment for the event $e_{m,z}$ to the upward node and the time that the upward node receives the event fragment for the event $e_{m,z}$, which is represented as $\Delta_{up_{l,k}}$.

In Equation 29, the disentangled time $DT_{e_{m,z+2}}$ for event $e_{m,z+2}$ is determined based on the received time $rt_{M,\ up_{l,k}}$ that the upward node received the event fragment for $e_{m,z+2}$ based on the upward node's clock and the age $a_2$ for the event $e_{m,z+2}$. The distance from the ideal disentangled time for the event $e_{m,z+2}$ is the sum of the delay between the time that Node m sends the event fragment for the event $e_{m,z+2}$ to Node 1 and the time that Node 1 received the event fragment, which is represented as $\Delta_{l,\ e_{m,z+2}}$, and the delay between the time that Node 1 sends the event fragment for the event $e_{m,z+2}$ to the upward node and the time that the upward node receives the event fragment for the event $e_{m,z+2}$, which is represented as $\Delta_{up_{l,k}}$.

In Equation 30, the disentangled time $DT_{e_{m,z+4}}$ for event $e_{m,z+4}$ is determined based on the received time $rt_{M,\ up_{l,k}}$ that the upward node received the event fragment for $e_{m,z+4}$ based on the upward node's clock and the age $a_3$ for the event $e_{m,z+4}$. The distance from the ideal disentangled time for the event $e_{m,z+4}$ is the sum of the delay between the time that Node m sends the event fragment for the event $e_{m,z+4}$ to Node 1 and the time that Node 1 received the event fragment, which is represented as $\Delta_{l,\ e_{m,z+4}}$, and the delay between the time that Node 1 sends the event fragment for the event $e_{m,z+4}$ to the upward node and the time that the upward node receives the event fragment for the event $e_{m,z+4}$, which is represented as $\Delta_{up_{l,k}}$.

By having the disentangled time (DT) for any events, coming from the same send queue in this case, the disentangled time of the rest of the events from the same node can be calculated. As the upward node has a sequence of all events (e.g., as received in the event fragment as described above), subsequently their time stamp C and time difference between each pair of events, the upward node can calculate potential disentangled times DTs for event $e_{m,z}$ and then compare them with the original disentangled time for event $e_{m,z}$ and use the best (which may be the earliest) disentangled time. For example, depending on which disentangled time(s) the upward node has, the upward node can use one or more of the following three relationships to determine any missing disentangled times and determine the best disentangled time for the events.

if $DT_{e_{m,z+4}}$: $DT'_{e_{m,z+2}} = DT_{e_{m,z+4}} - d_2$ & $DT'_{e_{m,z}} = DT_{e_{m,z+4}} - d_3$ if $DT_{e_{m,z+2}}$: $DT''_{e_{m,z+4}} = DT_{e_{m,z+2}} + d_2$ & $DT''_{e_{m,z}} = DT_{e_{m,z+2}} - d_1$ if $DT_{e_{m,z}}$: $DT'''_{e_{m,z+4}} = DT_{e_{m,z}} + d_3$ & $DT'''_{e_{m,z+2}} = DT_{e_{m,z}} + d_1$

In the first relationship, it is assumed that the upward node has determined the disentangled time $DT_{e_{m,z+4}}$ for event $e_{m,z+4}$. In this example, the upward node can determine the disentangled time $DT'_{e_{m,z+2}}$ for event $e_{m,z+2}$ as the difference between the disentangled time $DT_{e_{m,z+4}}$ for event $e_{m,z+4}$ and the time difference $d_2$ between events $e_{m,z+2}$ and $e_{m,z+4}$, which can be determined using Equation 23 above. Similarly, the upward node can determine the disentangled time $DT'_{e_{m,z}}$ for event $e_{m,z}$ as the difference between the disentangled time $DT_{e_{m,z+4}}$ for event $e_{m,z+4}$ and the time difference $d_3$ between events $e_{m,z}$ and $e_{m,z+4}$, which can be determined using Equation 24 above.

In the second relationship, it is assumed that the upward node has determined the disentangled time $DT_{e_{m,z+2}}$ for event $e_{m,z+2}$. In this example, the upward node can determine the disentangled time $DT''_{e_{m,z+4}}$ for event $e_{m,z+4}$ as the sum of the disentangled time $DT_{e_{m,z+2}}$ for event $e_{m,z+2}$ and the time difference $d_2$ between events $e_{m,z+2}$ and $e_{m,z+4}$, which can be determined using Equation 23 above. Similarly, the upward node can determine the disentangled time $DT''_{e_{m,z}}$ for event $e_{m,z}$ as the difference between the disentangled time $DT_{e_{m,z+2}}$ for event $e_{m,z+2}$ and the time difference $d_1$ between events $e_{m,z}$ and $e_{m,z+2}$, which can be determined using Equation 22 above.

In the third relationship, it is assumed that the upward node has determined the disentangled time $DT_{e_{m,z}}$ for event $e_{m,z}$. In this example, the upward node can determine the disentangled time $DT'''_{e_{m,z}}$ for event $e_{m,z+4}$ as the sum of the disentangled time $DT_{e_{m,z}}$ for event $e_{m,z}$ and the time difference $d_3$ between events $e_{m,z}$ and $e_{m,z+4}$, which can be determined using Equation 24 above. Similarly, the upward node can determine the disentangled time $DT'''_{e_{m,z+2}}$ for event $e_{m,z+2}$ as the sum of the disentangled time $DT_{e_{m,z}}$ for event $e_{m,z}$ and the time difference $d_1$ between events $e_{m,z}$ and $e_{m,z+2}$, which can be determined using Equation 22 above.

If it is assumed that $\Delta_{l,\ e_{m,z+4}} < \Delta_{l,\ e_{m,z}} < \Delta_{l,\ e_{m,z+2}}$, this would result in:

$$DT'_{e_{m,z}} < DT_{e_{m,z}} < DT''_{e_{m,z}}$$

The upward node can select the best disentangled time for event $e_{m,z}$ based on the three disentangled times shown above. In some implementations, the upward node selects, as the best disentangled time, the earliest disentangled time among the three possible disentangled times. The upward node can then use the selected disentangled time to determine the disentangled times for the other events using the relationship corresponding to the selected disentangled time for event $e_{m,z}$. For example, if the upward node selects disentangled time $DT_{e_{m,z}}$, the upward node can use the third relationship to determine the disentangled times for events $e_{m,z+2}$ and $e_{m,z+4}$.

In a second example method, the impact of upward broadcasting latency on disentangled times (DTs) is reduced by finding, a minimum average time of upward broadcasting at the node level. With the time passing and/or increment of number of upward broadcasting, it will get closer to the ideal disentangled time DT for each event.

Figure 14:
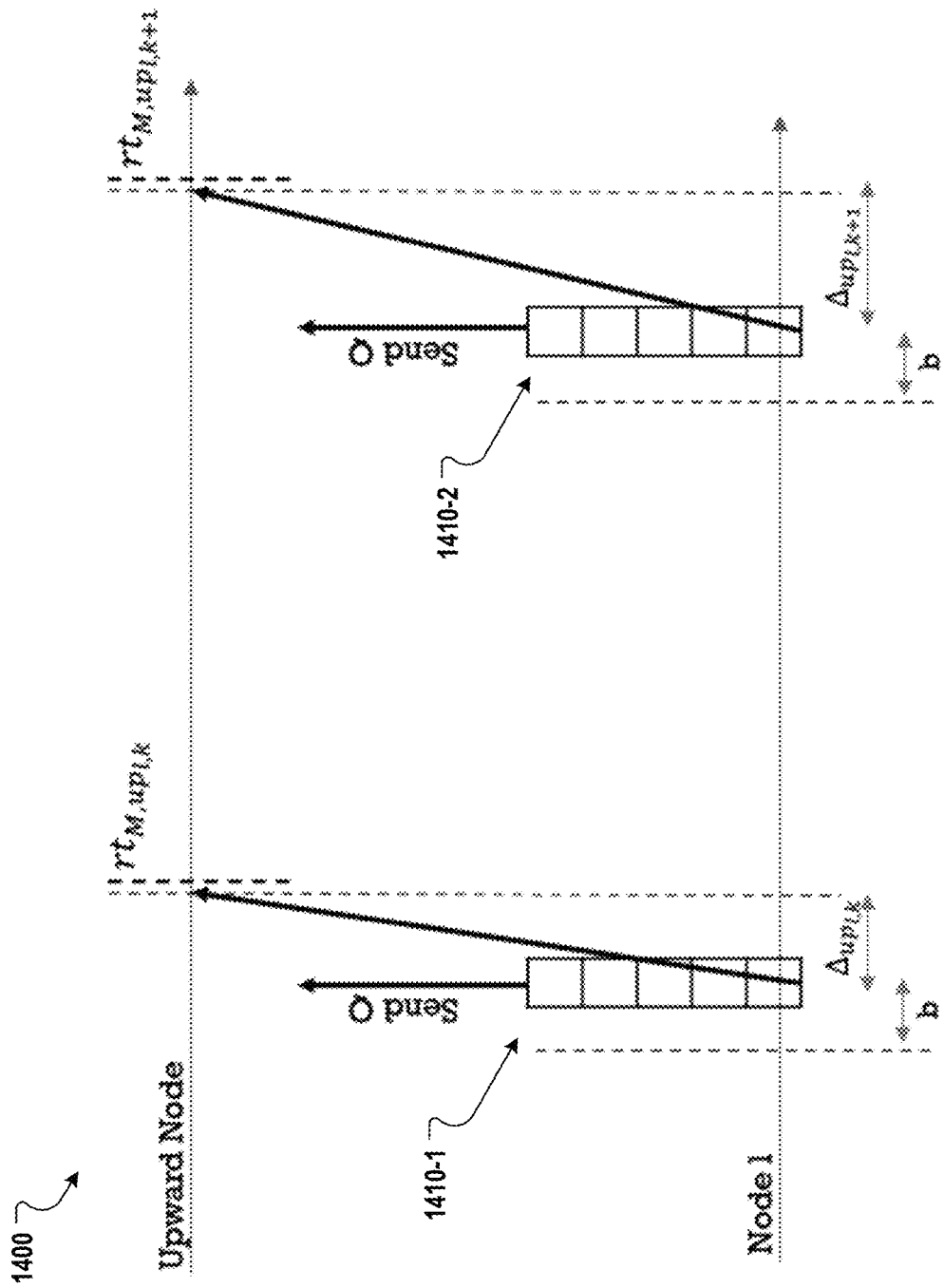
FIG. 14 is a diagram that shows example time delays for transmitting event fragments between nodes of a distributed system.

In FIG. 14, which is a diagram 1400 that shows example time delays for transmitting event fragments between nodes, two upward broadcasting of Node 1's queue (Q) 1410, at a $k^{th}$ time (1410-1) and at a $k+1^{th}$ time (1410-2) is shown. Note that this method considers b ms as buffer time before sending the queue and Node 1 will add any new event fragments to the next sending queue.

First, the upward node calculates the average time of upward broadcasting each individual element of the send queue 1410, which is represented as avg_send_time. The parameter Size_Q is the number of elements, e.g., event fragments, in the queue 1410. Then, the upward node compares the average send time with the best (e.g., smallest) average time of previous iterations and selects the minimum one as the new minimum send time which is represented as min_send_time.

$$\text{avg\_send\_time} = \Delta_{up_{l,k}} / \text{Size\_Q}$$

When evaluating the age of each element before upward broadcasting to the upward node, a fraction of min_send_time is added to the age. If the event fragment j if received from another node, e.g., Node $N_i$, Equation 31 can be used to determine the age of the event. If the event occurred at Node l, then Equation 32 can be used to determine the age of the event.

$$\text{Age} = st_{l,k} - rt_{l,e_{Ni,j}} + \alpha \times \text{Size\_Q} \times \text{min\_send\_time} \quad \text{Equation 31:}$$

$$\text{Age} = st_{l,k} - C_{l,e_{l,y}} + \alpha \times \text{Size\_Q} \times \text{min\_send\_time} \quad \text{Equation 32}$$

In Equation 31, the age of the event is determined based on the send time $st_{l,k}$ of the event fragment for the event, the received time $rt_{l,e_{Ni,j}}$ of the event fragment for the event, an impact factor, $\alpha$, the size of the queue Size_Q, and the minimum send time (min_send_time). In Equation 32, the age of the event is determined based on the send time $st_{l,k}$ of the event fragment for the event, the timestamp $C_{l,e_{l,y}}$ for the event, the impact factor, $\alpha$, the size of the queue Size_Q, and the minimum send time (min_send_time).

The impact factor, $\alpha$, represents how much of the minimum send time (min_send_time) will be added to the age of event fragments and events and it could be defined in various methods based on the use cases and application. Here, one example implementation is being shown. It would improve and get closer to ideal age by time passing and/or the number of upward broadcasting, Upcount. For example, in this case $k^{th}$, $k+1^{th}$ and ... $\beta$ is a constant value which determines how fast $\alpha$ convergence to 1 as shown in Equation 33 below:

$$\alpha = 1 - \frac{1}{\beta \times Upcount}; \text{ if } Upcount > 0 \text{ else } 0 \quad \text{Equation 33}$$

FIG. 15 shows example pseudocode 1500 for determining average and minimum send times at the node level. In this example pseudocode, the size (Size_Q) of the send queue is initialized to the length (Len_Q) of the send queue. The age of an event in the queue is evaluated using the send time (send_time), the buffer time (b), the minimum send time (min_send_time), the impact factor ($\alpha$), and the size (Size_Q) of the send queue. For example, the pseudocode could use Equations 31 and 32 above to determine the age of each event in the send queue.

A time parameter is initialized to the current time and the elements, e.g., event fragments, in the send queue are sent to the upward node. The average send time (avg_send_time) is determined based on the current time, the time parameter, and the size (Size_Q) of the send queue. The minimum send time is determined based on the minimum value of the minimum send time (min_send_time) and the average send time (avg_send_time).

In a third method, the disentangled time (DT) of events is improved by finding the best age at the upward node. This is achieved by analyzing various ages for each event coming from an origin node and its neighbor nodes.

Figure 16:
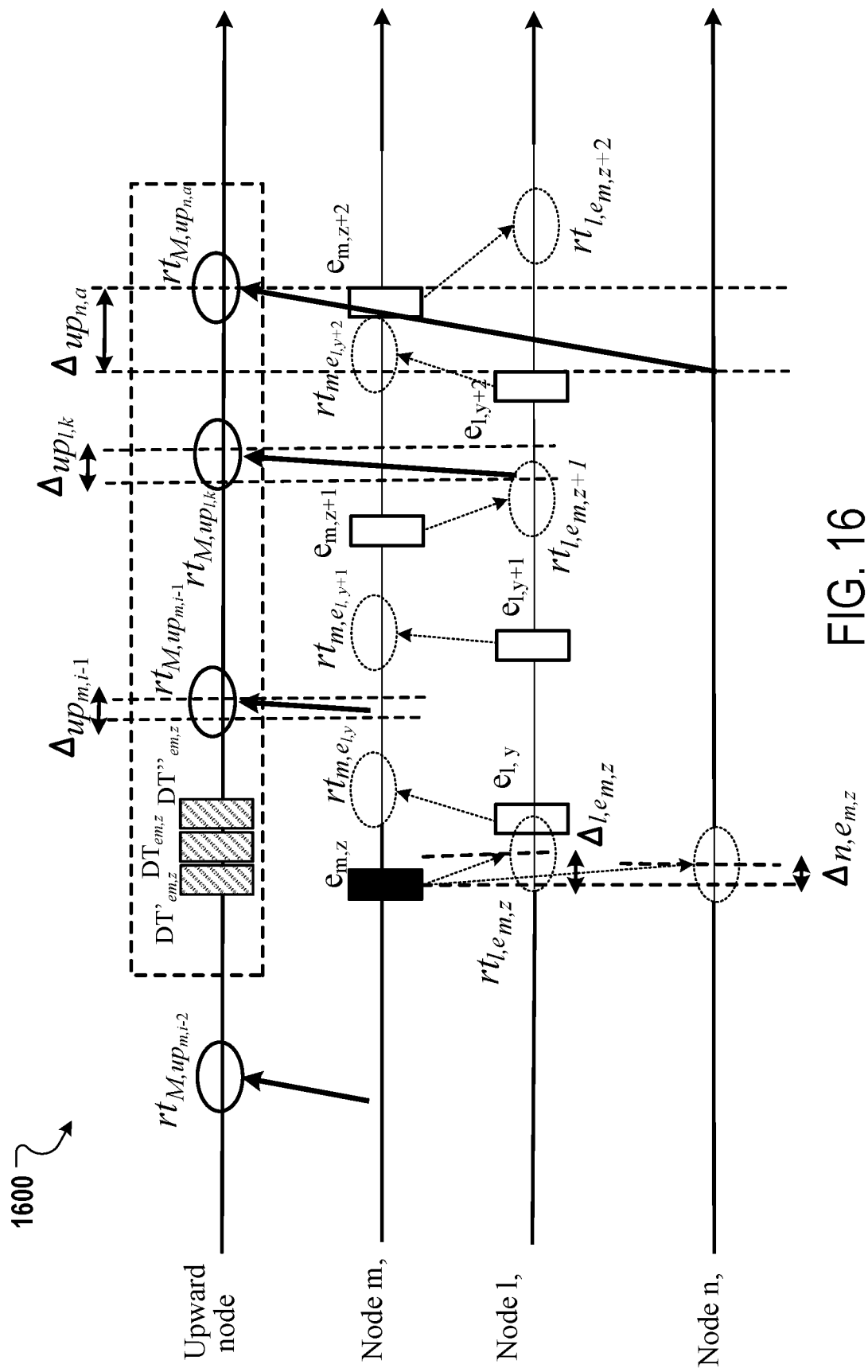
FIG. 16 is a diagram that shows an event sequence for events that occur at nodes of a distributed system.

FIG. 16 is a diagram that shows an example event sequence 1600 for events that occur at nodes of a distributed system. In this figure, an event $e_{m,z}$ created at Node m and an event fragment for the event $e_{m,z}$ have been received at Node l and Node n with $\Delta_{l,e_{m,z}}$ and $\Delta_{n,e_{m,z}}$ latency, respectively.

All three nodes Node m, Node l, and Node n send, e.g., broadcast, their queues including the event fragment for event $e_{m,z}$, which will be received at the upward node with $\Delta_{up_{m,i-1}}$, $\Delta_{up_{l,k}}$ and $\Delta_{up_{n,a}}$ latencies, respectively. A combination of these latencies will create three potential three potential disentangled times for $e_{m,z}$: $DT_{e_{m,z}}$, $DT'_{e_{m,z}}$ and $DT''_{e_{m,z}}$, which can be defined using the following relationships:

$$DT_{e_{m,z}}: \Delta_{up_{m,i-1}}$$

$$DT'_{e_{m,z}}: \Delta_{up_{l,k}} + \Delta_{l,e_{m,z}}$$

$$DT''_{e_{m,z}}: \Delta_{up_{n,a}} + \Delta_{n,e_{m,z}}$$

The upward node can analyze the disentangled times of $e_{m,z}$ in order of their reception at the upward node to choose the best (e.g., earliest) one. If there was any for which the disentangled time needs to be updated, not only is $e_{m,z}$ updated, but also previous events' disentangled times that came from the same node, here Node m, and before $e_{m,z}$, e.g., $e_{m,z-1}$, $e_{m,z-2}$ and so on, are also updated.

Figure 17:
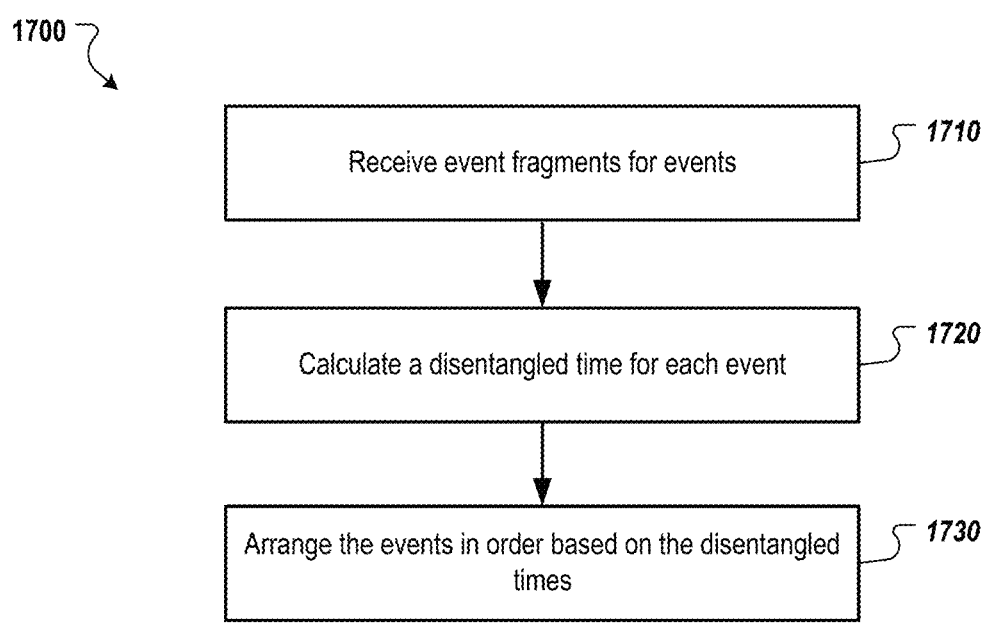
FIG. 17 shows a flow chart of an example process for arranging events in order.

FIG. 17 shows a flow chart of an example process 1700 for arranging events in order. The process 1700 can be performed by a node, e.g., an upward node, of a distributed system that includes multiple nodes communicably coupled to each other, e.g., via a network. Operations of the process 1700 can also be implemented as instructions stored on one or more computer readable media, which may be non-transitory, and execution of the instructions by one or more data processing apparatus can cause the one or more data processing apparatus to perform the operations of the process 1700. For brevity, the example process 1700 is described in terms of being performed by an upward node.

The upward node 1700 receives event fragments for events that have occurred within the distributed system (1710). Each event fragment includes, for example, an age parameter that indicates an age of the corresponding event from a perspective of a node that sent the event fragment to the upward node. Each event fragment can include additional data, as described above, e.g., with reference to FIG. 4.

The age for each event can be calculated by the node that sends the event fragment for the event to the upward node. This node can calculate the age using different techniques. For example, the age can be calculated in different ways depending on whether the event occurred at the node calculating the age or another node that sent an event fragment to the node performing the calculations. In a particular example, the age for each event that occurred at the node that sends the event fragment for the event to the upward node can be equal to a difference between (i) a send time at which the node sends the event fragment for the event to the upward node and (ii) a time at which the event occurred at the node, e.g., using Equation 2. The age for each event that occurred at a different node that is different from a given node that sends the event fragment for the node to the upward node can be equal to a difference between (i) a send time at which the given node sends the event fragment for the event to the upward node and (ii) a timestamp for the event, e.g., using Equation 1. The timestamp for the event is received from the different node and is determined by the different node based on a time at which the event occurred at the different node.

In some implementations, the age parameter can be determined in ways that account for latency within the distributed system. For example, the age parameter for each event can be selected from multiple possible ages where at least one of the possible ages is based on an age of one or more other events, e.g., using Equations 25-27. The age parameter for each event can be based on a minimum send time for sending event fragments, e.g., using Equations 31 and 32.

The upward node calculates a disentangled time for each event (1720). The disentangled time for each event can be based on a received time that represents a time at which the upward node received the event fragment for the event and the age of the event indicated by the age parameter for the event, as described above. The disentangled time for each event can be equal to a difference between the received time for the event fragment for the event and the age of the event. Any of the techniques described above can be used to calculate the disentangled time for each event.

The upward node arranges the events in an order according to the corresponding disentangled time for each event (1730). For example, the upward node can put the events in order from the lowest disentangled time to the highest disentangled time.

The upward node can also perform actions based on the events and/or their order. For example, some events and/or particular sequences of events can trigger actions by the upward node.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 18:
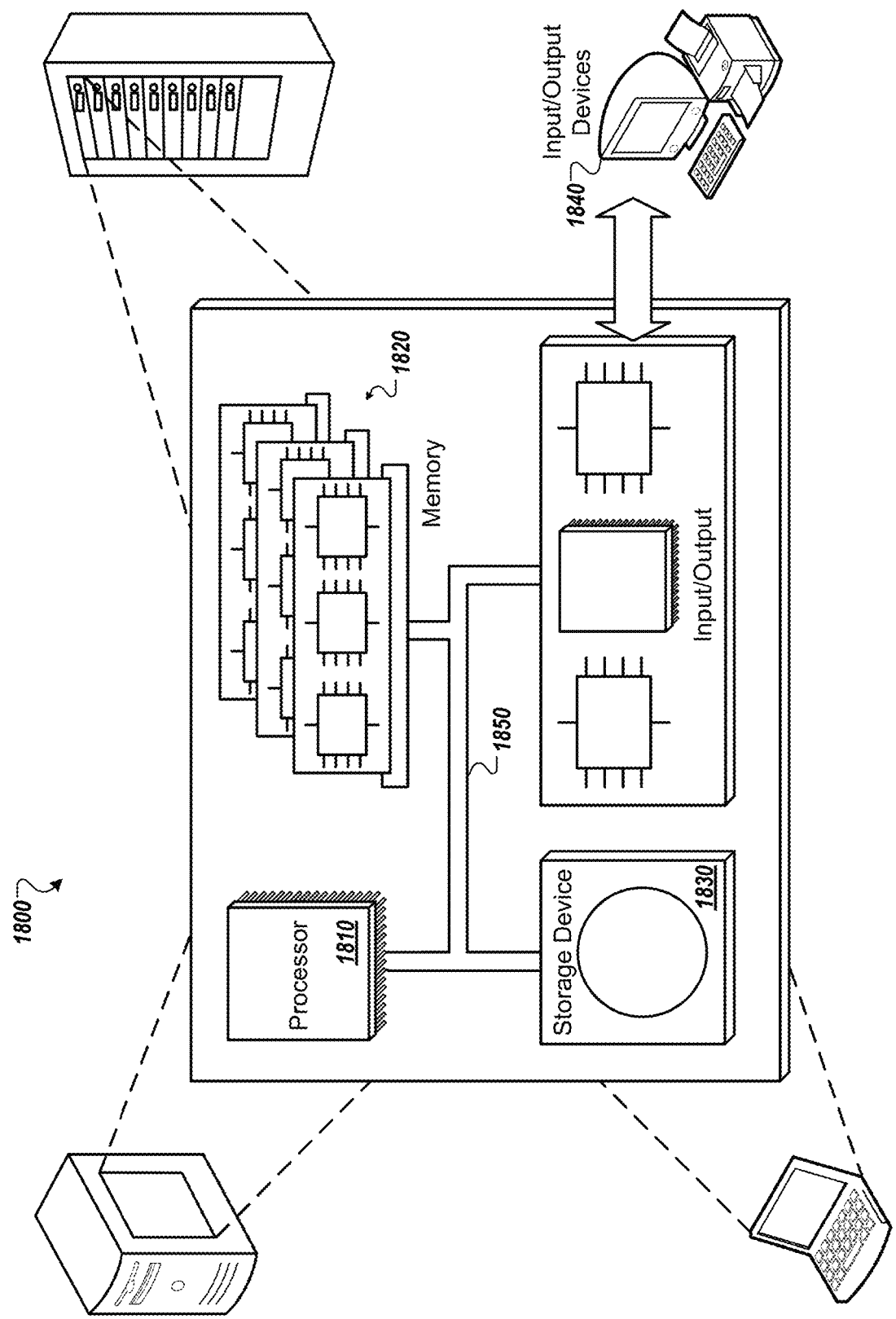
FIG. 18 shows a computing system that can be used in connection with computer-implemented methods described in this document.

An example of one such type of computer is shown in FIG. 18, which shows a schematic diagram of a computer system 1800. The system 1800 can be used for the operations described in association with any of the computer-implemented methods described previously, according to one implementation. The system 1800 includes a processor 1810, a memory 1820, a storage device 1830, and an input/output device 1840. Each of the components 1810, 1820, 1830, and 1740 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   receiving, by an upward node from one or more nodes of a distributed computing system, event fragments for corresponding events that have occurred within the distributed computing system, wherein each event fragment comprises an age parameter that indicates an age of the corresponding event from a perspective of a node that sent the event fragment to the upward node;
   calculating, by the upward node and for each event, a corresponding disentangled time using both (i) a received time that represents a time at which the upward node received the event fragment for the event and (ii) the age of the event indicated by the age parameter for the event; and
   storing, by the upward node, the events in memory according to an order of the corresponding disentangled time for each event.

2. The method of claim 1, further comprising performing one or more actions based on the stored events.

3. The method of claim 1, wherein the disentangled time for each event is equal to a difference between the received time for the event fragment for the event and the age of the event.

4. The method of claim 1, wherein the age for each event is calculated by the node that sends the event fragment for the event to the upward node.

5. The method of claim 1, wherein the age for each event that occurred at the node that sends the event fragment for the event to the upward node is equal to a difference between (i) a send time at which the node sends the event fragment for the event to the upward node and (ii) a time at which the event occurred at the node.

6. The method of claim 1, wherein the age for each event that occurred at a different node that is different from a given node that sends the event fragment for the node to the upward node is equal to a difference between (i) a send time at which the given node sends the event fragment for the event to the upward node and (ii) a timestamp for the event.

7. The method of claim 6, wherein the timestamp for the event is received from the different node and is determined by the different node based on a time at which the event occurred at the different node.

8. The method of claim 1, wherein the age parameter for each event is selected from multiple possible ages, and wherein at least one of the possible ages is based on an age of one or more other events.

9. The method of claim 1, wherein the age parameter for each event is based on a minimum send time for sending event fragments.

10. The method of claim 1, wherein receiving, by the upward node from the one or more nodes of the distributed computing system, the event fragments for corresponding events that have occurred within the distributed computing system comprises:
receiving, by the upward node from the one or more nodes of the distributed computing system, a data value representing an elapsed time between when the event occurred, prior to the received time, and when the given node sent the corresponding event fragment.

11. The method of claim 1, wherein storing, by the upward node, the events in memory according to an order of the corresponding disentangled time for each event comprises:
storing a sequence data field parameter of the events in memory, wherein the sequence data field parameter indicates the order of the corresponding disentangled time for each event.

12. A system comprising:
one or more processors; and
one or more storage devices storing instructions that, when executed by the one or more processors, cause the one or more processor to perform operations comprising:
receiving, by an upward node from one or more nodes of a distributed computing system, event fragments for corresponding events that have occurred within the distributed computing system, wherein each event fragment comprises an age parameter that indicates an age of the corresponding event from a perspective of a node that sent the event fragment to the upward node;
calculating, by the upward node and for each event, a corresponding disentangled time using both (i) a received time that represents a time at which the upward node received the event fragment for the event and (ii) the age of the event indicated by the age parameter for the event; and
storing, by the upward node, the events in memory according to an order of the corresponding disentangled time for each event.

13. The system of claim 12, wherein the operations comprise performing one or more actions based on the stored events.

14. The system of claim 12, wherein the disentangled time for each event is equal to a difference between the received time for the event fragment for the event and the age of the event.

15. The system of claim 12, wherein the age for each event is calculated by the node that sends the event fragment for the event to the upward node.

16. The system of claim 12, wherein the age for each event that occurred at the node that sends the event fragment for the event to the upward node is equal to a difference between (i) a send time at which the node sends the event fragment for the event to the upward node and (ii) a time at which the event occurred at the node.

17. The system of claim 12, wherein the age for each event that occurred at a different node that is different from a given node that sends the event fragment for the node to the upward node is equal to a difference between (i) a send time at which the given node sends the event fragment for the event to the upward node and (ii) a timestamp for the event.

18. The system of claim 17, wherein the timestamp for the event is received from the different node and is determined by the different node based on a time at which the event occurred at the different node.

19. The system of claim 12, wherein the age parameter for each event is selected from multiple possible ages, and wherein at least one of the possible ages is based on an age of one or more other events.

20. A non-transitory computer readable medium carrying instructions that, when executed by one or more processors, cause the one or more processors to perform operations comprising:
receiving, by an upward node from one or more nodes of a distributed computing system, event fragments for corresponding events that have occurred within the distributed computing system, wherein each event fragment comprises an age parameter that indicates an age of the corresponding event from a perspective of a node that sent the event fragment to the upward node;
calculating, by the upward node and for each event, a corresponding disentangled time using both (i) a received time that represents a time at which the upward node received the event fragment for the event and (ii) the age of the event indicated by the age parameter for the event; and
storing, by the upward node, the events in memory according to an order of the corresponding disentangled time for each event.

\* \* \* \* \*